United States Patent
Oh et al.

(10) Patent No.: US 10,616,618 B2
(45) Date of Patent: Apr. 7, 2020

(54) BROADCAST SIGNAL TRANSMITTING DEVICE, BROADCAST SIGNAL RECEIVING DEVICE, BROADCAST SIGNAL TRANSMITTING METHOD AND BROADCAST SIGNAL RECEIVING METHOD

(71) Applicant: LG ELECTRONICS INC., Seoul (KR)

(72) Inventors: Hyunmook Oh, Seoul (KR); Jongyeul Suh, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

(21) Appl. No.: 15/747,329

(22) PCT Filed: Sep. 12, 2016

(86) PCT No.: PCT/KR2016/010254
§ 371 (c)(1),
(2) Date: Jan. 24, 2018

(87) PCT Pub. No.: WO2017/043943
PCT Pub. Date: Mar. 16, 2017

(65) Prior Publication Data
US 2018/0220172 A1  Aug. 2, 2018

Related U.S. Application Data

(60) Provisional application No. 62/217,038, filed on Sep. 11, 2015.

(51) Int. Cl.
*H04N 21/2362* (2011.01)
*H04N 21/435* (2011.01)
(Continued)

(52) U.S. Cl.
CPC ....... *H04N 21/2362* (2013.01); *H04N 21/435* (2013.01); *H04N 21/84* (2013.01);
(Continued)

(58) Field of Classification Search
None
See application file for complete search history.

(56) References Cited

U.S. PATENT DOCUMENTS 7,913,277 B1   3/2011 Rahrer
2004/0006575 A1*  1/2004 Visharam ......... H04N 21/23424
(Continued)

FOREIGN PATENT DOCUMENTS

JP       5325557 B2    10/2013
KR   10-1316743 B1    10/2013
(Continued)

*Primary Examiner* — James R Marandi
(74) *Attorney, Agent, or Firm* — Birch, Stewart, Kolasch & Birch, LLP

(57) ABSTRACT

The present invention presents a method for transmitting a broadcast signal. The method for transmitting the broadcast signal, according to the present invention, presents a system capable of supporting next-generation broadcast services in an environment supporting a next-generation hybrid broadcast using a terrestrial broadcast network and the internet network. In addition, presented is an efficient signaling method capable of covering both the terrestrial broadcast network and the internet network in the environment supporting the next-generation hybrid broadcast.

10 Claims, 18 Drawing Sheets

(51) Int. Cl.
*H04N 21/84* (2011.01)
*H04N 21/434* (2011.01)
*H04N 21/236* (2011.01)
*H04H 60/73* (2008.01)
*H04N 21/2343* (2011.01)

(52) U.S. Cl.
CPC .... *G06T 2207/20208* (2013.01); *H04H 60/73* (2013.01); *H04N 21/236* (2013.01); *H04N 21/2343* (2013.01); *H04N 21/434* (2013.01)

(56) References Cited

U.S. PATENT DOCUMENTS

| | | | |
|---|---|---|---|
| 2013/0086463 A1* | 4/2013 | Mandal | G06F 17/30905 715/227 |
| 2015/0208095 A1* | 7/2015 | Schierl | H04N 19/70 375/240.28 |
| 2016/0309154 A1* | 10/2016 | Rusanovskyy | H04N 19/159 |
| 2016/0366444 A1* | 12/2016 | Sullivan | H04N 19/70 |

FOREIGN PATENT DOCUMENTS

| | | |
|---|---|---|
| WO | WO 2015/010056 A1 | 1/2015 |
| WO | WO 2015/126213 A1 | 8/2015 |

* cited by examiner

FIG. 1

| SLT | Media Processing Unit (MPU) | | signaling | signaling | NRT | DASH | NRT | signaling |
|---|---|---|---|---|---|---|---|---|
| | MPU mode payload | | | | | | | |
| SLT | MPEG Media Transport Protocol (MMTP) | | | ROUTE (ALC/LCT) | | | HTTP | |
| UDP | UDP | | | UDP | | | TCP | |
| IP | IP | | | IP | | | IP | |
| Data Link Layer (e.g. GSE or TLV or ALP) | | | | | | | Data Link Layer | |
| Physical Layer (e.g. ATSC 3.0) | | | | | | | Physical Layer | |
| Broadcast | | | | | | | Broadband | |

FIG. 3

| Syntax | No. of Bits | Format |
|---|---|---|
| LLS_table() { | | |
|    LLS_table_id | 8 | uimsbf |
|    provider_id | 8 | uimsbf |
|    LLS_table_version | 8 | uimsbf |
|    switch (LLS_table_id) { | | |
|       case 0x01: | | |
|          SLT | var | Sec. 6.3 |
|          break; | | |
|       case 0x02: | | |
|          RRT | var | See Annex F |
|          break; | | |
|       case 0x03: | | |
|          System Time | var | Sec. 6.4 |
|          break; | | |
|       case 0x04: | | |
|          CAP | var | Sec. 6.5 |
|          break; | | |
|       default: | | |
|          reserved | var | |
|    } | | |
| } | | |

(3010)

| Element or Attribute Name | Use | Data Type |
|---|---|---|
| SLT | | |
|   @bsid | 1 | unsignedShort |
|   @sltCapabilities | 0..1 | string |
|   sltInetUrl | 0..1 | anyURL |
|     @urlType | 1 | unsignedByte |
|   Service | 1..N | |
|     @serviceId | 1 | unsignedShort |
|     @sltSvcSeqNum | 1 | unsignedByte |
|     @protected | 0..1 | boolean |
|     @majorChannelNo | 0..1 | 1..999 |
|     @minorChannelNo | 0..1 | 1..999 |
|     @serviceCategory | 1 | unsignedByte |
|     @shortServiceName | 0..1 | string |
|     @hidden | 0..1 | boolean |
|     @broadbandAccessRequired | 0..1 | boolean |
|     @svcCapabilities | 0..1 | string |
|     BroadcastSvcSignaling | 0..1 | |
|       @slsProtocol | 1 | unsignedByte |
|       @slsMajorProtocolVersion | 1 | unsignedByte |
|       @slsMinorProtocolVersion | 1 | unsignedByte |
|       @slsPlpID | 0..1 | unsignedByte |
|       @slsDestinationIpAddress | 1 | string |
|       @slsDestinationUdpPort | 1 | unsignedShort |
|       @slsSourceIpAddress | 1 | string |
|     svcInetUrl | 0..N | anyURL |
|       @urlType | 1 | unsignedByte |

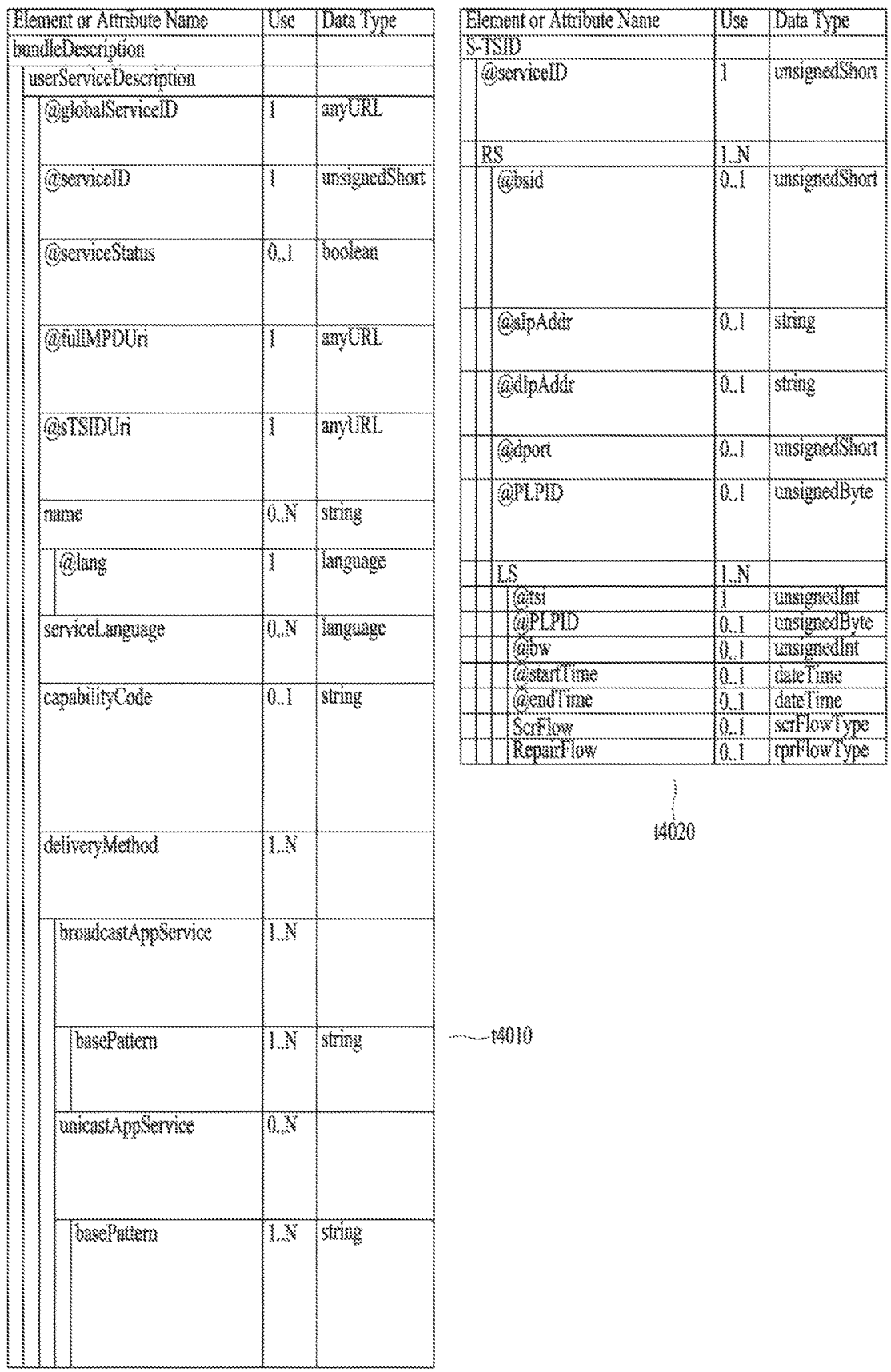

| Element or Attribute Name | | | | | Use | Data Type |
|---|---|---|---|---|---|---|
| bundleDescription | | | | | | |
| | userServiceDescription | | | | | |
| | | @globalServiceID | | | 1 | anyURL |
| | | @serviceID | | | 1 | unsignedShort |
| | | @serviceStatus | | | 0..1 | boolean |
| | | @fullMPDUri | | | 1 | anyURL |
| | | @sTSIDUri | | | 1 | anyURL |
| | | name | | | 0..N | string |
| | | | @lang | | 1 | language |
| | | serviceLanguage | | | 0..N | language |
| | | capabilityCode | | | 0..1 | string |
| | | deliveryMethod | | | 1..N | |
| | | | broadcastAppService | | 1..N | |
| | | | | basePattern | 1..N | string |
| | | | unicastAppService | | 0..N | |
| | | | | basePattern | 1..N | string |

| Element or Attribute Name | | | Use | Data Type |
|---|---|---|---|---|
| S-TSID | | | | |
| | @serviceID | | 1 | unsignedShort |
| | RS | | 1..N | |
| | | @bsid | 0..1 | unsignedShort |
| | | @sIpAddr | 0..1 | string |
| | | @dIpAddr | 0..1 | string |
| | | @dport | 0..1 | unsignedShort |
| | | @PLPID | 0..1 | unsignedByte |
| | | LS | 1..N | |
| | | @tsi | 1 | unsignedInt |
| | | @PLPID | 0..1 | unsignedByte |
| | | @bw | 0..1 | unsignedInt |
| | | @startTime | 0..1 | dateTime |
| | | @endTime | 0..1 | dateTime |
| | | SrcFlow | 0..1 | scrFlowType |
| | | RepairFlow | 0..1 | rprFlowType | t4010
t4020

FIG. 5

| Element or Attribute Name | Use |
|---|---|
| bundleDescription | |
|   userServiceDescription | |
|     @globalServiceID | M |
|     @serviceID | M |
|     Name | 0..N |
|       @lang | CM |
|     serviceLanguage | 0..N |
|     contentAdvisoryRating | 0..1 |
|     Channel | 1 |
|       @serviceGenre | 0..1 |
|       @serviceIcon | 1 |
|       ServiceDescription | 0..N |
|         @serviceDescrText | 1 |
|         @serviceDescrLang | 0..1 |
|     mpuComponent | 0..1 |
|       @mmtPackageId | 1 |
|       @nextMmtPackageId | 0..1 |
|     routeComponent | 0..1 |
|       @sTSIDUri | 1 |
|       @sTSIDDestinationIpAddress | 0..1 |
|       @sTSIDDestinationUdpPort | 1 |
|       @sTSIDSourceIpAddress | 1 |
|       @sTSIDMajorProtocolVersion | 0..1 |
|       @sTSIDMinorProtocolVersion | 0..1 |
|     broadbandComponent | 0..1 |
|       @fullMPDUri | 1 |
|     ComponentInfo | 1..N |
|       @ComponentType | 1 |
|       @ComponentRole | 1 |
|       @ComponentProtectedFlag | 0..1 |
|       @ComponentId | 1 |
|       @ComponentName | 0..1 |

FIG. 6
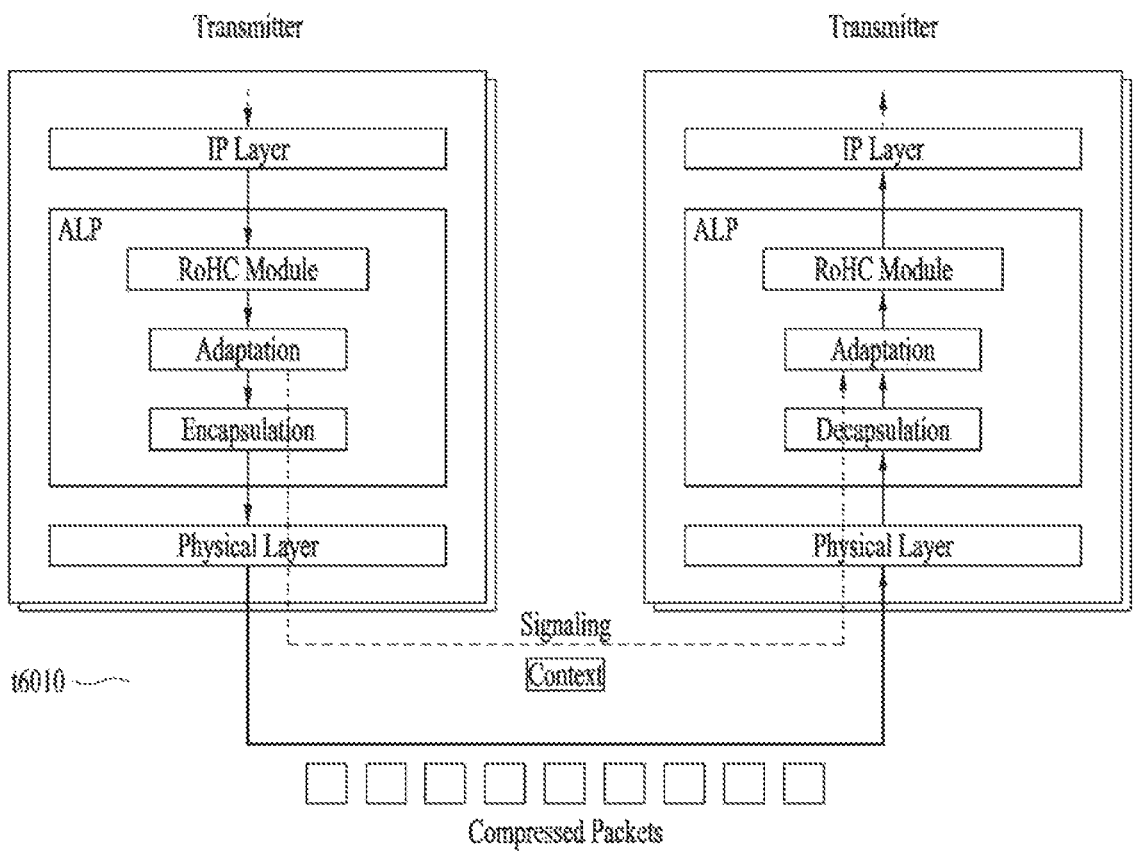
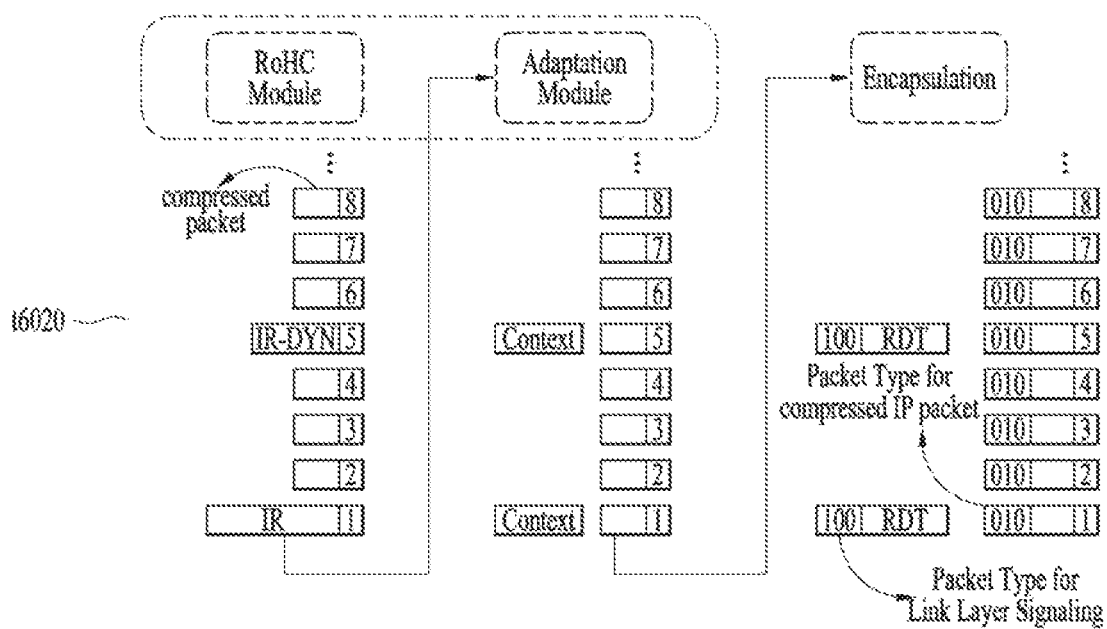

FIG. 7

| Syntax | Number of bits | Format |
|---|---|---|
| Link_Mapping_Table() { | | |
|    signaling_type | 8 | 0x01 |
|    PLP_ID | 6 | uimsbf |
|    reserved | 2 | "11" |
|    num_session | 8 | uimsbf |
|    for(i = 0 ; i < num_session ; i++) { | | |
|       src_IP_add | 32 | uimsbf |
|       dst_IP_add | 32 | uimsbf |
|       src_UDP_port | 16 | uimsbf |
|       dst_UDP_port | 16 | uimsbf |
|       SID_flag | 1 | bslbf |
|       compressed_flag | 1 | bslbf |
|       reserved | 6 | '111111' |
|       if(SID_flag == "1") { | | |
|          SID | 8 | uimsbf |
|       } | | |
|       if(compressed_flag == "1") { | | |
|          context_id | 8 | uimsbf |
|       } | | |
|    } | | |
| } | | |

FIG. 11

| Metadata_container(payloadSize) { | No. of bits | Descriptor |
|---|---|---|
| number of metadata types | 8 | uimsbf |
| for(i=0; i<number of metadata types; i++) { | | |
|    metadata_type[i] | 4 | uimsbf |
|    exclusive_metadata_flag[i] | 1 | uimsbf |
|    reserved | 3 | uimsbf |
|    number_of_metadata[i] | 8 | uimsbf |
|    for(j=0; j<number_of_metadata[i]; j++) { | | |
|      metadata_sub_type_flag[i][j] | 1 | uimsbf |
|      reserved | 7 | uimsbf |
|      if(metadata_sub_type_flag[i][j] == 0) { | | |
|        metadata_PayloadType[i][j] | 8 | uimsbf |
|        metadata_set_number[i][j] | 8 | uimsbf |
|        metadata_version_number[i][j] | 8 | uimsbf |
|        metadata_change_flag[i][j] | 1 | uimsbf |
|        reserved | 7 | uimsbf |
|      } | | |
|      else { | | |
|        metadata_sub_type[i][j] | 4 | uimsbf |
|        exclusive_metadata_flag[i][j] | 1 | uimsbf |
|        reserved | 3 | uimsbf |
|        number_of_metadata[i][j] | 8 | uimsbf |
|        for(k=0; k<number_of_metadata[i][j]; k++) { | | |
|          metadata_PayloadType[i][j][k] | 8 | uimsbf |
|          metadata_set_number[i][j][k] | 8 | uimsbf |
|          metadata_version_number[i][j][k] | 8 | uimsbf |
|          metadata_change_flag[i][j][k] | 1 | uimsbf |
|          reserved | 7 | uimsbf |
|        } | | |
|      } | | |
|    } | | |
| program_reset_flag | 1 | uimsbf |
| reserved | 7 | uimsbf |
| } | | |

| sei_payload( payloadType, payloadSize ) { | Category | Descriptor |
|---|---|---|
| ... | | |
| if( payloadType == 53 ) | | |
|    Metadata_container(payloadSize) | 5 | |

FIG. 14
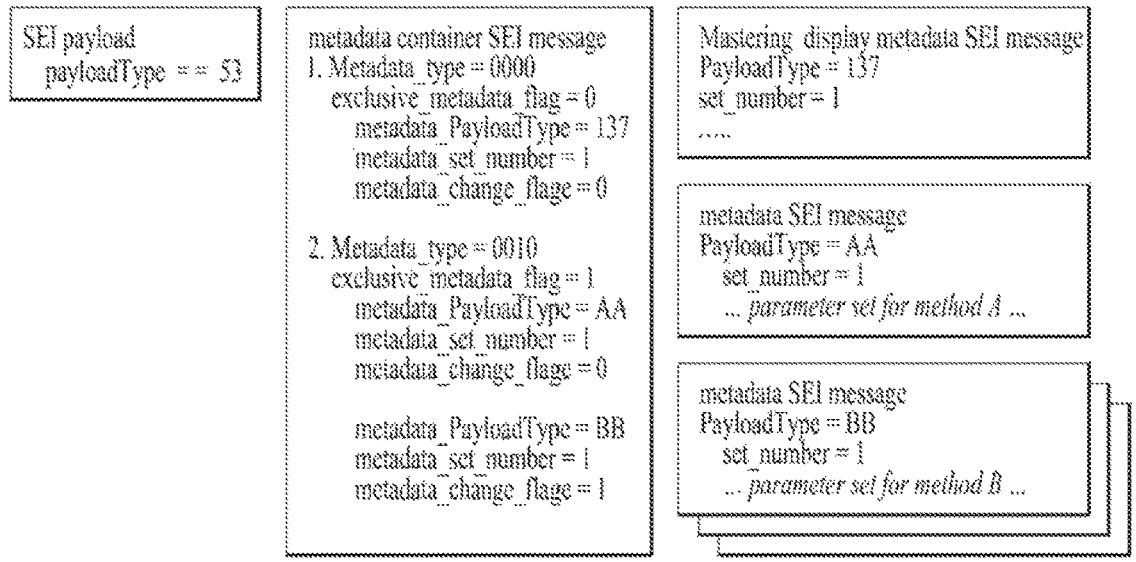
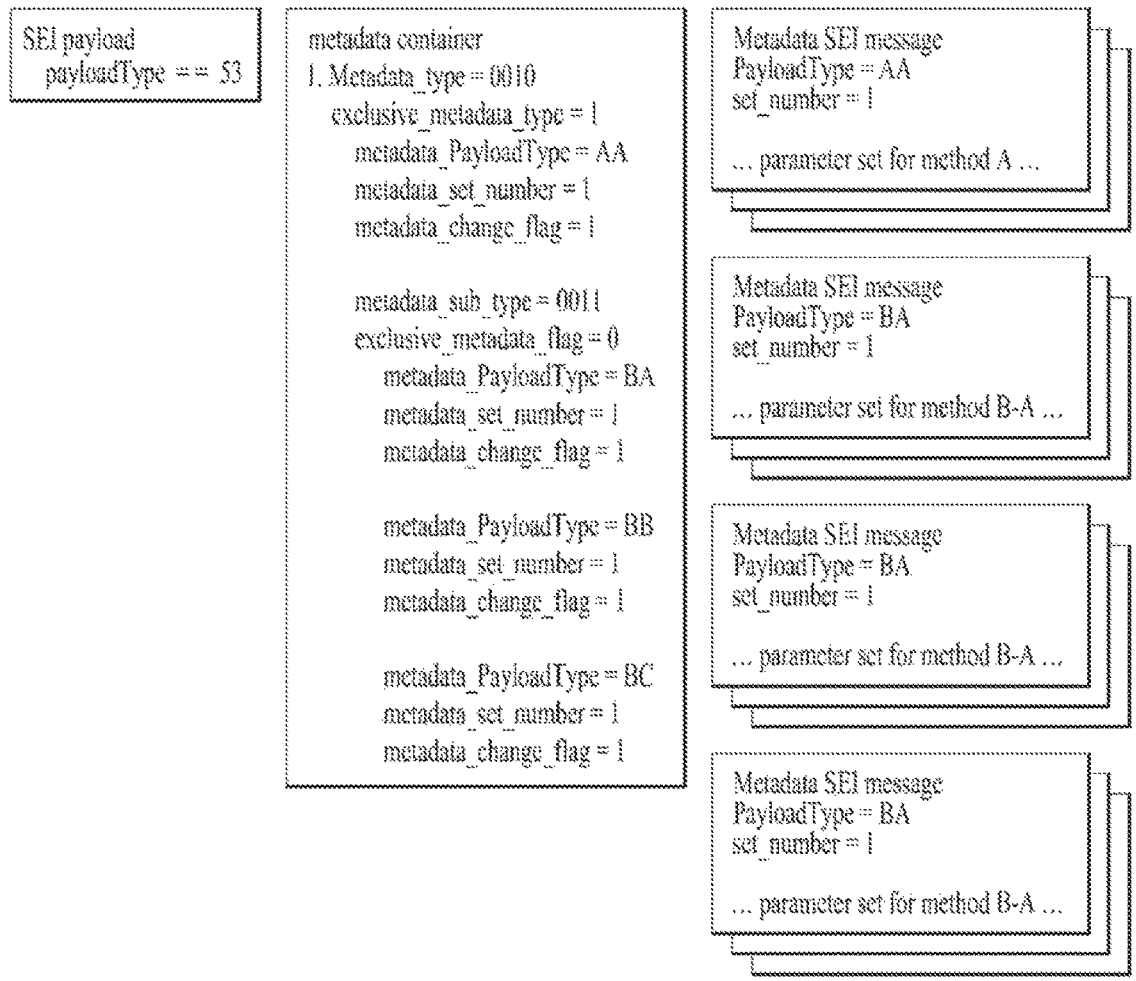

FIG. 15

| Syntax | No. of bits | Mnemonic |
|---|---|---|
| TS_program_map_section() { | | |
|   table_id | 8 | uimsbf |
|   section_syntax_indicator | 1 | bslbf |
|   '0' | 1 | bslbf |
|   reserved | 2 | bslbf |
|   section_length | 12 | uimsbf |
|   program_number | 16 | uimsbf |
|   reserved | 2 | bslbf |
|   version_number | 5 | uimsbf |
|   current_next_indicator | 1 | bslbf |
|   section_number | 8 | uimsbf |
|   last_section_number | 8 | uimsbf |
|   reserved | 3 | bslbf |
|   PCR_PID | 13 | uimsbf |
|   reserved | 4 | bslbf |
|   program_info_length | 12 | uimsbf |
|   for( i=0; i<N; i++) { | | |
|     descriptor() | | |
|   } | | |
|   for( i=0; i<N1; i++) { | | |
|     stream_type | 8 | uimsbf |
|     reserved | 3 | bslbf |
|     elementary_PID | 13 | uimsbf |
|     reserved | 4 | bslbf |
|     ES_info_length | 12 | uimsbf |
|     for( i=0; i<N2; i++) { | | |
|       descriptor() | | |
|     } | | |
|   } | | |
|   CRC_32 | 32 | rpchof |
| } | | |

→ Metadata_container_descriptor()

| Syntax | No. of bits | Format |
|---|---|---|
| UHD_program_info_descriptor () { | | |
|   descriptor_tag | 8 | uimsbf |
|   descriptor_length | 8 | uimsbf |
|   UHD_service_type | 4 | uimsbf |
|   Reserved | 4 | |
| } | | |

| UHD_service_type | 사용 예시 |
|---|---|
| 0000 | UHD1 |
| 0001 | UHD2 |
| 0010-0111 | Reserved |
| 1000-1111 | User private |

→ UHD_service_type = XXXX (UHD1 service with multiple video metadata)

FIG. 16

| Syntax | No. of bits | Format |
|---|---|---|
| metadata_container_descriptor( ) { | | |
|     descriptor_tag | 8 | uimsbf |
|     descriptor_length | 8 | uimsbf |
|     reserved | 4 | |
|     number_of_info | 4 | |
|     for(i=0; i<number_of_info; i++) { | | |
|         metadata_container_metadata () | | |
|     } | | |
| } | | | ated are being developed. A digital broadcast signal may include a larger amount of video/audio data than an analog broadcast signal and further include various types of additional data in addition to the video/audio data.

BROADCAST SIGNAL TRANSMITTING DEVICE, BROADCAST SIGNAL RECEIVING DEVICE, BROADCAST SIGNAL TRANSMITTING METHOD AND BROADCAST SIGNAL RECEIVING METHOD

CROSS REFERENCE TO RELATED APPLICATIONS

This application is the National Phase of PCT International Application No. PCT/KR2016/010254, filed on Sep. 12, 2016, which claims priority under 35 U.S.C. 119(e) to U.S. Provisional Application No. 62/217,038, filed on Sep. 11, 2015, all of which are hereby expressly incorporated by reference into the present application.

TECHNICAL FIELD

The present invention relates to processing of a broadcast signal transmission device, a broadcast signal reception device, and broadcast signal transmission/reception methods.

BACKGROUND ART

As analog broadcasting comes to an end, various technologies for transmitting/receiving digital broadcast signals are being developed. A digital broadcast signal may include a larger amount of video/audio data than an analog broadcast signal and further include various types of additional data in addition to the video/audio data.

UHD broadcast aims at provision of more enhanced video quality and immersiveness than HD broadcast to viewers. To this end, a method of extending the dynamic range and color gamut of content in UHD to a dynamic range and a color gamut that can be perceived by the human visual system, that is, HDR (High Dynamic Range) and WCG (Wide Color Gamut), are expected to be introduced. That is, content with enhanced contrast and colors is provided and thus users can experience improved immersiveness and realism. The present invention proposes methods of effectively presenting brightness and colors according to intention of a producer when content is displayed on a display such that users can view images with enhanced video quality.

DISCLOSURE

Technical Problem

That is, a digital broadcast system can provide HD (high definition) images, multichannel audio and various additional services. However, data transmission efficiency for transmission of large amounts of data, robustness of transmission/reception networks and network flexibility in consideration of mobile reception equipment need to be improved for digital broadcast.

Technical Solution

The present invention provides a system capable of effectively supporting next-generation broadcast services in an environment supporting next-generation hybrid broadcasting using terrestrial broadcast networks and the Internet and related signaling methods as included and approximately described herein according to objects of the present invention.

Advantageous Effects

The present invention provides a signaling method for causing a receiver to acquire only metadata necessary therefor from among a plurality of pieces of metadata for video data processing.

The present invention provides a receiver operation method for acquiring only metadata necessary for a receiver from among a plurality of pieces of metadata for video data processing.

DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 1 is a diagram illustrating a protocol stack according to one embodiment of the present invention;

FIG. 3 is a diagram showing a low level signaling (LLS) table and a service list table (SLT) according to one embodiment of the present invention;

FIG. 4 is a diagram showing a USBD and an S-TSID delivered through ROUTE according to one embodiment of the present invention;

FIG. 5 is a diagram showing a USBD delivered through MMT according to one embodiment of the present invention;

FIG. 6 is a diagram showing link layer operation according to one embodiment of the present invention;

FIG. 7 is a diagram showing a link mapping table (LMT) according to one embodiment of the present invention;

FIG. 11 is a diagram showing a configuration of a metadata container descriptor according to an embodiment of the present invention;

FIG. 14 is a diagram showing a usage example of metadata container information according to another embodiment of the present invention;

FIG. 15 is a diagram for describing a case in which the metadata container information according to an embodiment of the present invention is signaled through a PMT (program map table);

FIG. 16 is a diagram for describing a case in which the metadata container information according to an embodiment of the present invention is signaled through an EIT (event information table);

BEST MODE

Figure 2:
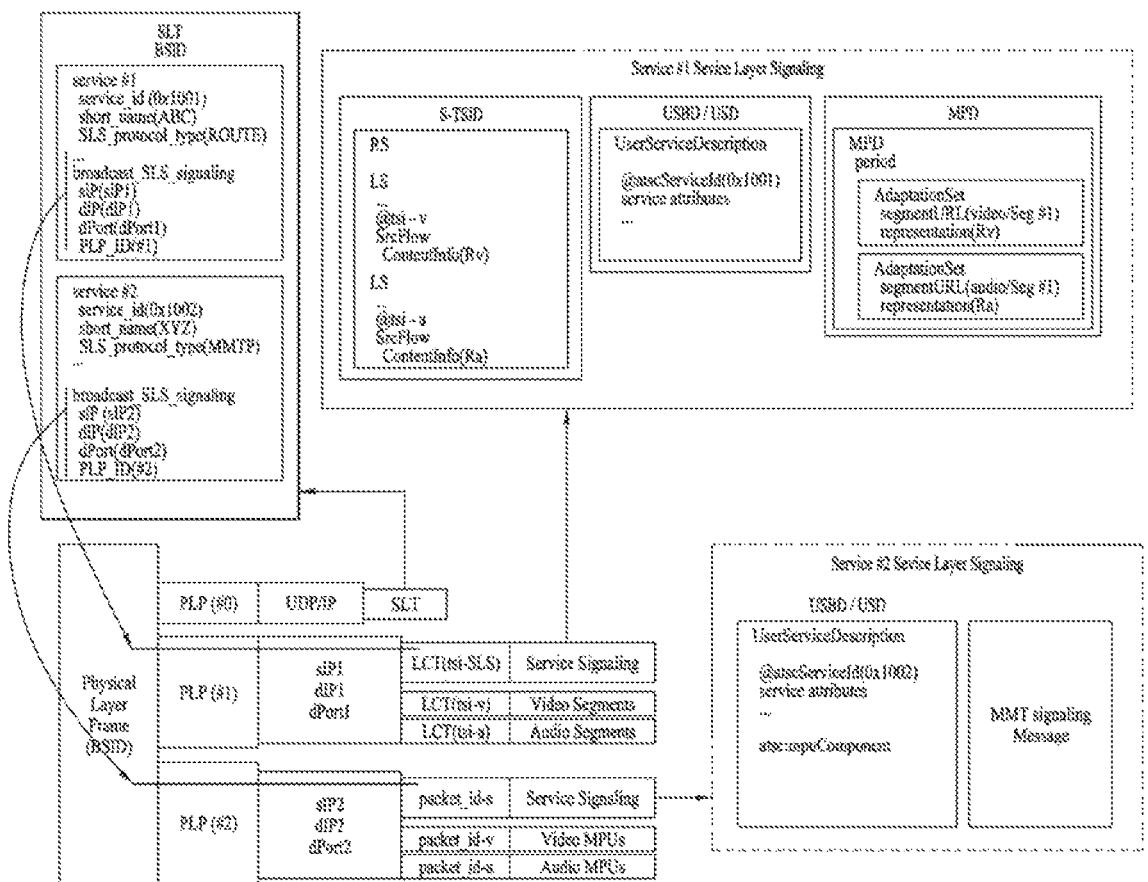
FIG. 2 is a diagram illustrating a service discovery procedure according to one embodiment of the present invention.

The present invention provides devices and methods for transmitting and receiving broadcast signals for next-generation broadcast services. Next-generation broadcast services according to an embodiment of the present invention include a terrestrial broadcast service, a mobile broadcast service, an ultra high definition television (UHDTV) service, etc. The present invention may process broadcast signals for the next-generation broadcast services through non-MIMO (Multiple Input Multiple Output) or MIMO according to one embodiment. A non-MIMO scheme according to an embodiment of the present invention may include a MISO (Multiple Input Single Output) scheme, a SISO (Single Input Single Output) scheme, etc. The present invention proposes a physical profile (or system) optimized to minimize receiver complexity while accomplishing performance required for a specific purpose.

FIG. 1 is a diagram showing a protocol stack according to an embodiment of the present invention.

A service may be delivered to a receiver through a plurality of layers. First, a transmission side may generate service data. The service data may be processed for transmission at a delivery layer of the transmission side and the service data may be encoded into a broadcast signal and transmitted over a broadcast or broadband network at a physical layer.

Here, the service data may be generated in an ISO base media file format (BMFF). ISO BMFF media files may be used for broadcast/broadband network delivery, media encapsulation and/or synchronization format. Here, the service data is all data related to the service and may include service components configuring a linear service, signaling information thereof, non-real time (NRT) data and other files.

The delivery layer will be described. The delivery layer may provide a function for transmitting service data. The service data may be delivered over a broadcast and/or broadband network.

Broadcast service delivery may include two methods.

As a first method, service data may be processed in media processing units (MPUs) based on MPEG media transport (MMT) and transmitted using an MMT protocol (MMTP). In this case, the service data delivered using the MMTP may include service components for a linear service and/or service signaling information thereof.

As a second method, service data may be processed into DASH segments and transmitted using real time object delivery over unidirectional transport (ROUTE), based on MPEG DASH. In this case, the service data delivered through the ROUTE protocol may include service components for a linear service, service signaling information thereof and/or NRT data. That is, the NRT data and non-timed data such as files may be delivered through ROUTE.

Data processed according to MMTP or ROUTE protocol may be processed into IP packets through a UDP/IP layer. In service data delivery over the broadcast network, a service list table (SLT) may also be delivered over the broadcast network through a UDP/IP layer. The SLT may be delivered in a low level signaling (LLS) table. The SLT and LLS table will be described later.

IP packets may be processed into link layer packets in a link layer. The link layer may encapsulate various formats of data delivered from a higher layer into link layer packets and then deliver the packets to a physical layer. The link layer will be described later.

In hybrid service delivery, at least one service element may be delivered through a broadband path. In hybrid service delivery, data delivered over broadband may include service components of a DASH format, service signaling information thereof and/or NRT data. This data may be processed through HTTP/TCP/IP and delivered to a physical layer for broadband transmission through a link layer for broadband transmission.

The physical layer may process the data received from the delivery layer (higher layer and/or link layer) and transmit the data over the broadcast or broadband network. A detailed description of the physical layer will be given later.

The service will be described. The service may be a collection of service components displayed to a user, the components may be of various media types, the service may be continuous or intermittent, the service may be real time or non-real time, and a real-time service may include a sequence of TV programs.

The service may have various types. First, the service may be a linear audio/video or audio service having app based enhancement. Second, the service may be an app based service, reproduction/configuration of which is controlled by a downloaded application. Third, the service may be an ESG service for providing an electronic service guide (ESG). Fourth, the service may be an emergency alert (EA) service for providing emergency alert information.

When a linear service without app based enhancement is delivered over the broadcast network, the service component may be delivered by (1) one or more ROUTE sessions or (2) one or more MMTP sessions.

When a linear service having app based enhancement is delivered over the broadcast network, the service component may be delivered by (1) one or more ROUTE sessions or (2) zero or more MMTP sessions. In this case, data used for app based enhancement may be delivered through a ROUTE session in the form of NRT data or other files. In one embodiment of the present invention, simultaneous delivery of linear service components (streaming media components) of one service using two protocols may not be allowed.

When an app based service is delivered over the broadcast network, the service component may be delivered by one or more ROUTE sessions. In this case, the service data used for the app based service may be delivered through the ROUTE session in the form of NRT data or other files.

Some service components of such a service, some NRT data, files, etc. may be delivered through broadband (hybrid service delivery).

That is, in one embodiment of the present invention, linear service components of one service may be delivered through the MMT protocol. In another embodiment of the present invention, the linear service components of one service may be delivered through the ROUTE protocol. In another embodiment of the present invention, the linear service components of one service and NRT data (NRT service components) may be delivered through the ROUTE protocol. In another embodiment of the present invention, the linear service components of one service may be delivered through the MMT protocol and the NRT data (NRT service components) may be delivered through the ROUTE protocol. In the above-described embodiments, some service components of the service or some NRT data may be delivered through broadband. Here, the app based service and data regarding app based enhancement may be delivered over the broadcast network according to ROUTE or through broadband in the form of NRT data. NRT data may be referred to as locally cached data.

Each ROUTE session includes one or more LCT sessions for wholly or partially delivering content components configuring the service. In streaming service delivery, the LCT session may deliver individual components of a user service, such as audio, video or closed caption stream. The streaming media is formatted into a DASH segment.

Each MMTP session includes one or more MMTP packet flows for delivering all or some of content components or an MMT signaling message. The MMTP packet flow may deliver a component formatted into MPU or an MMT signaling message.

For delivery of an NRT user service or system metadata, the LCT session delivers a file based content item. Such content files may include consecutive (timed) or discrete (non-timed) media components of the NRT service or metadata such as service signaling or ESG fragments. System metadata such as service signaling or ESG fragments may be delivered through the signaling message mode of the MMTP.

A receiver may detect a broadcast signal while a tuner tunes to frequencies. The receiver may extract and send an SLT to a processing module. The SLT parser may parse the SLT and acquire and store data in a channel map. The receiver may acquire and deliver bootstrap information of the SLT to a ROUTE or MMT client. The receiver may acquire and store an SLS. USBD may be acquired and parsed by a signaling parser.

FIG. 2 is a diagram showing a service discovery procedure according to one embodiment of the present invention.

A broadcast stream delivered by a broadcast signal frame of a physical layer may carry low level signaling (LLS). LLS data may be carried through payload of IP packets delivered to a well-known IP address/port. This LLS may include an SLT according to type thereof. The LLS data may be formatted in the form of an LLS table. A first byte of every UDP/IP packet carrying the LLS data may be the start of the LLS table. Unlike the shown embodiment, an IP stream for delivering the LLS data may be delivered to a PLP along with other service data.

The SLT may enable the receiver to generate a service list through fast channel scan and provides access information for locating the SLS. The SLT includes bootstrap information. This bootstrap information may enable the receiver to acquire service layer signaling (SLS) of each service. When the SLS, that is, service signaling information, is delivered through ROUTE, the bootstrap information may include an LCT channel carrying the SLS, a destination IP address of a ROUTE session including the LCT channel and destination port information. When the SLS is delivered through the MMT, the bootstrap information may include a destination IP address of an MMTP session carrying the SLS and destination port information.

In the shown embodiment, the SLS of service #1 described in the SLT is delivered through ROUTE and the SLT may include bootstrap information sIP1, dIP1 and dPort1 of the ROUTE session including the LCT channel delivered by the SLS. The SLS of service #2 described in the SLT is delivered through MMT and the SLT may include bootstrap information sIP2, dIP2 and dPort2 of the MMTP session including the MMTP packet flow delivered by the SLS.

The SLS is signaling information describing the properties of the service and may include receiver capability information for significantly reproducing the service or providing information for acquiring the service and the service component of the service. When each service has separate service signaling, the receiver acquires appropriate SLS for a desired service without parsing all SLSs delivered within a broadcast stream.

When the SLS is delivered through the ROUTE protocol, the SLS may be delivered through a dedicated LCT channel of a ROUTE session indicated by the SLT. In some embodiments, this LCT channel may be an LCT channel identified by tsi=0. In this case, the SLS may include a user service bundle description (USBD)/user service description (USD), service-based transport session instance description (S-TSID) and/or media presentation description (MPD).

Here, USBD/USD is one of SLS fragments and may serve as a signaling hub describing detailed description information of a service. The USBD may include service identification information, device capability information, etc. The USBD may include reference information (URI reference) of other SLS fragments (S-TSID, MPD, etc.). That is, the USBD/USD may reference the S-TSID and the MPD. In addition, the USBD may further include metadata information for enabling the receiver to decide a transmission mode (broadcast/broadband network). A detailed description of the USBD/USD will be given below.

The S-TSID is one of SLS fragments and may provide overall session description information of a transport session carrying the service component of the service. The S-TSID may provide the ROUTE session through which the service component of the service is delivered and/or transport session description information for the LCT channel of the ROUTE session. The S-TSID may provide component acquisition information of service components associated with one service. The S-TSID may provide mapping between DASH representation of the MPD and the tsi of the service component. The component acquisition information of the S-TSID may be provided in the form of the identifier of the associated DASH representation and tsi and may or may not include a PLP ID in some embodiments. Through the component acquisition information, the receiver may collect audio/video components of one service and perform buffering and decoding of DASH media segments. The S-TSID may be referenced by the USBD as described above. A detailed description of the S-TSID will be given below.

The MPD is one of SLS fragments and may provide a description of DASH media presentation of the service. The MPD may provide a resource identifier of media segments and provide context information within the media presentation of the identified resources. The MPD may describe DASH representation (service component) delivered over the broadcast network and describe additional DASH presentation delivered over broadband (hybrid delivery). The MPD may be referenced by the USBD as described above.

When the SLS is delivered through the MMT protocol, the SLS may be delivered through a dedicated MMTP packet flow of the MMTP session indicated by the SLT. In some embodiments, the packet_id of the MMTP packets delivering the SLS may have a value of 00. In this case, the SLS may include a USBD/USD and/or MMT packet (MP) table.

Here, the USBD is one of SLS fragments and may describe detailed description information of a service as in ROUTE. This USBD may include reference information (URI information) of other SLS fragments. The USBD of the MMT may reference an MP table of MMT signaling. In some embodiments, the USBD of the MMT may include reference information of the S-TSID and/or the MPD. Here, the S-TSID is for NRT data delivered through the ROUTE protocol. Even when a linear service component is delivered through the MMT protocol, NRT data may be delivered via the ROUTE protocol. The MPD is for a service component delivered over broadband in hybrid service delivery. A detailed description of the USBD of the MMT will be given below.

The MP table is a signaling message of the MMT for MPU components and may provide overall session description information of an MMTP session carrying the service component of the service. In addition, the MP table may include a description of an asset delivered through the MMTP session. The MP table is streaming signaling information for MPU components and may provide a list of assets corresponding to one service and location information (component acquisition information) of these components. The detailed description of the MP table may be defined in the MMT or modified. Here, the asset is a multimedia data entity, is combined by one unique ID, and may mean a data entity used to one multimedia presentation. The asset may correspond to service components configuring one service. A streaming service component (MPU) corresponding to a desired service may be accessed using the MP table. The MP table may be referenced by the USBD as described above.

Other MMT signaling messages may be defined. Additional information associated with the service and the MMTP session may be described by such MMT signaling messages.

The ROUTE session is identified by a source IP address, a destination IP address and a destination port number. The LCT session is identified by a unique transport session identifier (TSI) within the range of a parent ROUTE session. The MMTP session is identified by a destination IP address and a destination port number. The MMTP packet flow is identified by a unique packet_id within the range of a parent MMTP session.

In case of ROUTE, the S-TSID, the USBD/USD, the MPD or the LCT session delivering the same may be referred to as a service signaling channel. In case of MMTP, the USBD/UD, the MMT signaling message or the packet flow delivering the same may be referred to as a service signaling channel.

Unlike the shown embodiment, one ROUTE or MMTP session may be delivered over a plurality of PLPs. That is, one service may be delivered through one or more PLPs. Unlike the shown embodiment, in some embodiments, components configuring one service may be delivered through different ROUTE sessions. In addition, in some embodiments, components configuring one service may be delivered through different MMTP sessions. In some embodiments, components configuring one service may be divided and delivered in a ROUTE session and an MMTP session. Although not shown, components configuring one service may be delivered through broadband (hybrid delivery).

FIG. 3 is a diagram showing a low level signaling (LLS) table and a service list table (SLT) according to one embodiment of the present invention.

One embodiment t3010 of the LLS table may include information according to an LLS_table_id field, a provider_id field, an LLS_table_version field and/or an LLS_table_id field.

The LLS_table_id field may identify the type of the LLS table, and the provider_id field may identify a service provider associated with services signaled by the LLS table. Here, the service provider is a broadcaster using all or some of the broadcast streams and the provider_id field may identify one of a plurality of broadcasters which is using the broadcast streams. The LLS_table_version field may provide the version information of the LLS table.

According to the value of the LLS_table_id field, the LLS table may include one of the above-described SLT, a rating region table (RRT) including information on a content advisory rating, SystemTime information for providing information associated with a system time, and a common alert protocol (CAP) message for providing information associated with emergency alert. In some embodiments, the other information may be included in the LLS table.

One embodiment t3020 of the shown SLT may include an @bsid attribute, an @sltCapabilities attribute, an sltInetUrl element and/or a Service element. Each field may be omitted according to the value of the shown Use column or a plurality of fields may be present.

The @bsid attribute may be the identifier of a broadcast stream. The @sltCapabilities attribute may provide capability information required to decode and significantly reproduce all services described in the SLT. The sltInetUrl element may provide base URL information used to obtain service signaling information and ESG for the services of the SLT over broadband. The sltInetUrl element may further include an @urlType attribute, which may indicate the type of data capable of being obtained through the URL.

The Service element may include information on services described in the SLT, and the Service element of each service may be present. The Service element may include an @serviceId attribute, an @sltSvcSeqNum attribute, an @protected attribute, an @majorChannelNo attribute, an @minorChannelNo attribute, an @serviceCategory attribute, an @shortServiceName attribute, an @hidden attribute, an @broadbandAccessRequired attribute, an @svcCapabilities attribute, a BroadcastSvcSignaling element and/or an svcInetUrl element.

The @serviceId attribute is the identifier of the service and the @sltSvcSeqNum attribute may indicate the sequence number of the SLT information of the service. The @protected attribute may indicate whether at least one service component necessary for significant reproduction of the service is protected. The @majorChannelNo attribute and the @minorChannelNo attribute may indicate the major channel number and minor channel number of the service, respectively.

The @serviceCategory attribute may indicate the category of the service. The category of the service may include a linear A/V service, a linear audio service, an app based service, an ESG service, an EAS service, etc. The @shortServiceName attribute may provide the short name of the service. The @hidden attribute may indicate whether the service is for testing or proprietary use. The @broadbandAccessRequired attribute may indicate whether broadband access is necessary for significant reproduction of the service. The @svcCapabilities attribute may provide capability information necessary for decoding and significant reproduction of the service.

The BroadcastSvcSignaling element may provide information associated with broadcast signaling of the service.

This element may provide information such as location, protocol and address with respect to signaling over the broadcast network of the service. Details thereof will be described below.

The svcInetUrl element may provide URL information for accessing the signaling information of the service over broadband. The sltInetUrl element may further include an @urlType attribute, which may indicate the type of data capable of being obtained through the URL.

The above-described BroadcastSvcSignaling element may include an @slsProtocol attribute, an @slsMajorProtocolVersion attribute, an @slsMinorProtocolVersion attribute, an @slsPlpId attribute, an @slsDestinationIpAddress attribute, an @slsDestinationUdpPort attribute and/or an @slsSourceIpAddress attribute.

The @slsProtocol attribute may indicate the protocol used to deliver the SLS of the service (ROUTE, MMT, etc.). The @slsMajorProtocolVersion attribute and the @slsMinorProtocolVersion attribute may indicate the major version number and minor version number of the protocol used to deliver the SLS of the service, respectively.

The @slsPlpId attribute may provide a PLP identifier for identifying the PLP delivering the SLS of the service. In some embodiments, this field may be omitted and the PLP information delivered by the SLS may be checked using a combination of the information of the below-described LMT and the bootstrap information of the SLT.

The @slsDestinationIpAddress attribute, the @slsDestinationUdpPort attribute and the @slsSourceIpAddress attribute may indicate the destination IP address, destination UDP port and source IP address of the transport packets delivering the SLS of the service, respectively. These may identify the transport session (ROUTE session or MMTP session) delivered by the SLS. These may be included in the bootstrap information.

FIG. 4 is a diagram showing a USBD and an S-TSID delivered through ROUTE according to one embodiment of the present invention.

One embodiment t4010 of the shown USBD may have a bundleDescription root element. The bundleDescription root element may have a userServiceDescription element. The userServiceDescription element may be an instance of one service.

The userServiceDescription element may include an @globalServiceID attribute, an @serviceId attribute, an @serviceStatus attribute, an @fullMDUri attribute, an @sTSIDUri attribute, a name element, a serviceLanguage element, a capabilityCode element and/or a deliveryMethod element. Each field may be omitted according to the value of the shown Use column or a plurality of fields may be present.

The @globalServiceID attribute is the globally unique identifier of the service and may be used for linkage with ESG data (Service@globalServiceID). The @serviceId attribute is a reference corresponding to the service entry of the SLT and may be equal to the service ID information of the SLT. The @serviceStatus attribute may indicate the status of the service. This field may indicate whether the service is active or inactive.

The ΩfullMPDUri attribute may reference the MPD fragment of the service. The MPD may provide a reproduction description of a service component delivered over the broadcast or broadband network as described above. The @sTSIDUri attribute may reference the S-TSID fragment of the service. The S-TSID may provide parameters associated with access to the transport session carrying the service as described above.

The name element may provide the name of the service. This element may further include an @lang attribute and this field may indicate the language of the name provided by the name element. The serviceLanguage element may indicate available languages of the service. That is, this element may arrange the languages capable of being provided by the service.

The capabilityCode element may indicate capability or capability group information of a receiver necessary to significantly reproduce the service. This information is compatible with capability information format provided in service announcement.

The deliveryMethod element may provide transmission related information with respect to content accessed over the broadcast or broadband network of the service. The deliveryMethod element may include a broadcastAppService element and/or a unicastAppService element. Each of these elements may have a basePattern element as a sub element.

The broadcastAppService element may include transmission associated information of the DASH representation delivered over the broadcast network. The DASH representation may include media components over all periods of the service presentation.

The basePattern element of this element may indicate a character pattern used for the receiver to perform matching with the segment URL. This may be used for a DASH client to request the segments of the representation. Matching may imply delivery of the media segment over the broadcast network.

The unicastAppService element may include transmission related information of the DASH representation delivered over broadband. The DASH representation may include media components over all periods of the service media presentation.

The basePattern element of this element may indicate a character pattern used for the receiver to perform matching with the segment URL. This may be used for a DASH client to request the segments of the representation. Matching may imply delivery of the media segment over broadband.

One embodiment t4020 of the shown S-TSID may have an S-TSID root element. The S-TSID root element may include an @serviceId attribute and/or an RS element. Each field may be omitted according to the value of the shown Use column or a plurality of fields may be present.

The @serviceId attribute is the identifier of the service and may reference the service of the USBD/USD. The RS element may describe information on ROUTE sessions through which the service components of the service are delivered. According to the number of ROUTE sessions, a plurality of elements may be present. The RS element may further include an @bsid attribute, an @sIpAddr attribute, an @dIpAddr attribute, an @dport attribute, an @PLPID attribute and/or an LS element.

The @bsid attribute may be the identifier of a broadcast stream in which the service components of the service are delivered. If this field is omitted, a default broadcast stream may be a broadcast stream including the PLP delivering the SLS of the service. The value of this field may be equal to that of the @bsid attribute.

The @sIpAddr attribute, the @dIpAddr attribute and the @dport attribute may indicate the source IP address, destination IP address and destination UDP port of the ROUTE session, respectively. When these fields are omitted, the default values may be the source address, destination IP address and destination UDP port values of the current ROUTE session delivering the SLS, that is, the S-TSID.

This field may not be omitted in another ROUTE session delivering the service components of the service, not in the current ROUTE session.

The @PLPID attribute may indicate the PLP ID information of the ROUTE session. If this field is omitted, the default value may be the PLP ID value of the current PEP delivered by the S-TSID. In some embodiments, this field is omitted and the PLP ID information of the ROUTE session may be checked using a combination of the information of the below-described LMT and the IP address/UDP port information of the RS element.

The LS element may describe information on LCT channels through which the service components of the service are transmitted. According to the number of LCT channels, a plurality of elements may be present. The LS element may include an @tsi attribute, an @PLPID attribute, an @bw attribute, an @startTime attribute, an @endTime attribute, a SrcFlow element and/or a RepairFlow element.

The @tsi attribute may indicate the tsi information of the LCT channel. Using this, the LCT channels through which the service components of the service are delivered may be identified. The @PLPID attribute may indicate the PLP ID information of the LCT channel. In some embodiments, this field may be omitted. The @bw attribute may indicate the maximum bandwidth of the LCT channel. The @startTime attribute may indicate the start time of the LCT session and the @endTime attribute may indicate the end time of the LCT channel.

The SrcFlow element may describe the source flow of ROUTE. The source protocol of ROUTE is used to transmit a delivery object and at least one source flow may be established within one ROUTE session. The source flow may deliver associated objects as an object flow.

The RepairFlow element may describe the repair flow of ROUTE. Delivery objects delivered according to the source protocol may be protected according to forward error correction (FEC) and the repair protocol may define an FEC framework enabling FEC protection.

FIG. 5 is a diagram showing a USBD delivered through MMT according to one embodiment of the present invention.

One embodiment of the shown USBD may have a bundleDescription root element. The bundleDescription root element may have a userServiceDescription element. The userServiceDescription element may be an instance of one service.

The userServiceDescription element may include an @globalServiceID attribute, an @serviceId attribute, a Name element, a serviceLanguage element, a contentAdvisoryRating element, a Channel element, a mpuComponent element, a routeComponent element, a broadbandComponent element and/or a ComponentInfo element. Each field may be omitted according to the value of the shown Use column or a plurality of fields may be present.

The @globalServiceID attribute, the @serviceId attribute, the Name element and/or the serviceLanguage element may be equal to the fields of the USBD delivered through ROUTE. The contentAdvisoryRating element may indicate the content advisory rating of the service. This information is compatible with content advisory rating information format provided in service announcement. The Channel element may include information associated with the service. A detailed description of this element will be given below.

The mpuComponent element may provide a description of service components delivered as the MPU of the service. This element may further include an @mmtPackageId attribute and/or an a nextMmtPackageId attribute. The @mmt-PackageId attribute may reference the MMT package of the service components delivered as the MPU of the service. The @nextMmtPackageId attribute may reference an MMT package to be used after the MMT package referenced by the @mmtPackageId attribute in terms of time. Through the information of this element, the MP table may be referenced.

The routeComponent element may include a description of the service components of the service. Even when linear service components are delivered through the MMT protocol, NRT data may be delivered according to the ROUTE protocol as described above. This element may describe information on such NRT data. A detailed description of this element will be given below.

The broadbandComponent element may include the description of the service components of the service delivered over broadband. In hybrid service delivery, some service components of one service or other files may be delivered over broadband. This element may describe information on such data. This element may further an @fullMP-DUri attribute. This attribute may reference the MPD describing the service component delivered over broadband. In addition to hybrid service delivery, the broadcast signal may be weakened due to traveling in a tunnel and thus this element may be necessary to support handoff between a broadcast network and broadband. When the broadcast signal is weak, the service component is acquired over broadband and, when the broadcast signal becomes strong, the service component is acquired over the broadcast network to secure service continuity.

The ComponentInfo element may include information on the service components of the service. According to the number of service components of the service, a plurality of elements may be present. This element may describe the type, role, name, identifier or protection of each service component. Detailed information of this element will be described below.

The above-described Channel element may further include an @serviceGenre attribute, an a serviceIcon attribute and/or a ServiceDescription element. The @serviceGenre attribute may indicate the genre of the service and the @serviceIcon attribute may include the URL information of the representative icon of the service. The ServiceDescription element may provide the service description of the service and this element may further include an @serviceDescrText attribute and/or an @serviceDescrLang attribute. These attributes may indicate the text of the service description and the language used in the text.

The above-described routeComponent element may further include an sTSIDUri attribute, an @sTSIDDestinationIpAddress attribute, an @sTSIDDestinationUdpPort attribute, an @sTSIDSourceIpAddress attribute, an @sTSIDMajorProtocolVersion attribute and/or an @sTSIDMinorProtocolVersion attribute.

The @sTSIDUri attribute may reference an S-TSID fragment. This field may be equal to the field of the USBD delivered through ROUTE. This S-TSID may provide access related information of the service components delivered through ROUTE. This S-TSID may be present for NRT data delivered according to the ROUTE protocol in a state of delivering linear service component according to the MMT protocol.

The @sTSIDDestinationIpAddress attribute, the @sTSIDDestinationUdpPort attribute and the @sTSIDSourceIpAddress attribute may indicate the destination IP address, destination UDP port and source IP address of the transport packets carrying the above-described S-TSID.

That is, these fields may identify the transport session (MMTP session or the ROUTE session) carrying the above-described S-TSID.

The @sTSIDMajorProtocolVersion attribute and the @sTSIDMinorProtocolVersion attribute may indicate the major version number and minor version number of the transport protocol used to deliver the above-described S-TSID, respectively.

The above-described ComponentInfo element may further include an @componentType attribute, an @componentRole attribute, an @componentProtectedFlag attribute, an @componentId attribute and/or an @componentName attribute.

The @componentType attribute may indicate the type of the component. For example, this attribute may indicate whether the component is an audio, video or closed caption component. The @componentRole attribute may indicate the role of the component. For example, this attribute may indicate main audio, music, commentary, etc. if the component is an audio component. This attribute may indicate primary video if the component is a video component. This attribute may indicate a normal caption or an easy reader type if the component is a closed caption component.

The @componentProtectedFlag attribute may indicate whether the service component is protected, for example, encrypted. The @componentId attribute may indicate the identifier of the service component. The value of this attribute may be the asset_id (asset ID) of the MP table corresponding to this service component. The @componentName attribute may indicate the name of the service component.

FIG. 6 is a diagram showing link layer operation according to one embodiment of the present invention.

The link layer may be a layer between a physical layer and a network layer. A transmission side may transmit data from the network layer to the physical layer and a reception side may transmit data from the physical layer to the network layer (t6010). The purpose of the link layer is to compress (abstract) all input packet types into one format for processing by the physical layer and to secure flexibility and expandability of an input packet type which is not yet defined. In addition, the link layer may provide options for compressing (abstracting) unnecessary information of the header of input packets to efficiently transmit input data. Operation such as overhead reduction, encapsulation, etc. of the link layer is referred to as a link layer protocol and packets generated using this protocol may be referred to as link layer packets. The link layer may perform functions such as packet encapsulation, overhead reduction and/or signaling transmission.

At the transmission side, the link layer (ALP) may perform an overhead reduction procedure with respect to input packets and then encapsulate the input packets into link layer packets. In addition, in some embodiments, the link layer may perform encapsulation into the link layer packets without performing the overhead reduction procedure. Due to use of the link layer protocol, data transmission overhead on the physical layer may be significantly reduced and the link layer protocol according to the present invention may provide IP overhead reduction and/or MPEG-2 TS overhead reduction.

When the shown IP packets are input as input packets (t6010), the link layer may sequentially perform IP header compression, adaptation and/or encapsulation. In some embodiments, some processes may be omitted. For example, the RoHC module may perform IP packet header compression to reduce unnecessary overhead. Context information may be extracted through the adaptation procedure and transmitted out of band. The IP header compression and adaption procedure may be collectively referred to as IP header compression. Thereafter, the IP packets may be encapsulated into link layer packets through the encapsulation procedure.

When MPEG-2 TS packets are input as input packets, the link layer may sequentially perform overhead reduction and/or an encapsulation procedure with respect to the TS packets. In some embodiments, some procedures may be omitted. In overhead reduction, the link layer may provide sync byte removal, null packet deletion and/or common header removal (compression). Through sync byte removal, overhead reduction of 1 byte may be provided per TS packet. Null packet deletion may be performed in a manner in which reinsertion is possible at the reception side. In addition, deletion (compression) may be performed in a manner in which common information between consecutive headers may be restored at the reception side. Some of the overhead reduction procedures may be omitted. Thereafter, through the encapsulation procedure, the TS packets may be encapsulated into link layer packets. The link layer packet structure for encapsulation of the TS packets may be different from that of the other types of packets.

First, IP header compression will be described.

The IP packets may have a fixed header format but some information necessary for a communication environment may be unnecessary for a broadcast environment. The link layer protocol may compress the header of the IP packet to provide a mechanism for reducing broadcast overhead.

IP header compression may include a header compressor/decompressor and/or an adaptation module. The IP header compressor (RoHC compressor) may reduce the size of each IP packet based on an RoHC method. Then, the adaptation module may extract context information and generate signaling information from each packet stream. A receiver may parse signaling information related to a corresponding packet stream and attach the context information to the packet stream. The RoHC decompressor may recover a packet header to reconfigure an original IP packet. Hereinafter, IP header compression may refer to only IP header compression according to a header compressor and may be a concept that combines IP header compression and the adaptation procedure by the adaptation module. This may be the same as in decompressing.

Hereinafter, adaptation will be described.

In transmission of a single-direction link, when the receiver does not have context information, the decompressor cannot restore the received packet header until complete context is received. This may lead to channel change delay and turn-on delay. Accordingly, through the adaptation function, configuration parameters and context information between the compressor and the decompressor may be transmitted out of band. The adaptation function may construct link layer signaling using context information and/or configuration parameters. The adaptation function may periodically transmit link layer signaling through each physical frame using a previous configuration parameter and/or context information.

Context information is extracted from the compressed IP packets and various methods may be used according to adaptation mode.

Mode #1 refers to a mode in which no operation is performed with respect to the compressed packet stream and an adaptation module operates as a buffer.

Mode #2 refers to a mode in which an IR packet is detected from a compressed packet stream to extract context information (static chain). After extraction, the IR packet is converted into an IR-DYN packet and the IR-DYN packet may be transmitted in the same order within the packet stream in place of an original IR packet.

Mode #3 (t6020) refers to a mode in which IR and IR-DYN packets are detected from a compressed packet stream to extract context information. A static chain and a dynamic chain may be extracted from the IR packet and a dynamic chain may be extracted from the IR-DYN packet. After extraction, the IR and IR-DYN packets are converted into normal compression packets. The converted packets may be transmitted in the same order within the packet stream in place of original IR and IR-DYN packets.

In each mode, the context information is extracted and the remaining packets may be encapsulated and transmitted according to the link layer packet structure for the compressed IP packets. The context information may be encapsulated and transmitted according to the link layer packet structure for signaling information, as link layer signaling.

The extracted context information may be included in a RoHC-U description table (RDT) and may be transmitted separately from the RoHC packet flow. Context information may be transmitted through a specific physical data path along with other signaling information. The specific physical data path may mean one of normal PLPs, a PLP in which low level signaling (LLS) is delivered, a dedicated PLP or an L1 signaling path. Here, the RDT may be context information (static chain and/or dynamic chain) and/or signaling information including information associated with header compression. In some embodiments, the RDT may be transmitted whenever context information is changed. In some embodiments, the RDT may be transmitted in every physical frame. To transmit the RDT in every physical frame, a previous RDT may be re-used.

The receiver may select a first PLP and first acquire signaling information of the SLT, the RDT, etc., prior to acquisition of a packet stream. Upon acquiring the signaling information, the receiver may combine the information to acquire mapping of service—IP information—context information—PLP. That is, the receiver may recognize IP streams through which a service is transmitted, IP streams transmitted through a PLP, and so on and acquire corresponding context information of the PLPs. The receiver may select a PLP for delivery of a specific packet stream and decode the PLP. The adaptation module may parse the context information and combine the context information with the compressed packets. Thereby, the packet stream may be recovered and transmitted to the RoHC decompressor. Then, decompression may be started. In this case, the receiver may detect an IR packet and start decompression from a first received IR packet according to an adaptation mode (mode 1), may detect an IR-DYN packet and start decompression from a first received IR-DYN packet (mode 2), or may start decompression from any general compressed packet (mode 3).

Hereinafter, packet encapsulation will be described.

The link layer protocol may encapsulate all types of input packets such as IP packets, TS packets, etc. into link layer packets. To this end, the physical layer processes only one packet format independently of the protocol type of the network layer (here, an MPEG-2 TS packet is considered as a network layer packet). Each network layer packet or input packet is modified into the payload of a generic link layer packet.

In the packet encapsulation procedure, segmentation may be used. If the network layer packet is too large to be processed in the physical layer, the network layer packet may be segmented into two or more segments. The link layer packet header may include fields for segmentation of the transmission side and recombination of the reception side. Each segment may be encapsulated into the link layer packet in the same order as the original location.

In the packet encapsulation procedure, concatenation may also be used. If the network layer packet is sufficiently small such that the payload of the link layer packet includes several network layer packets, concatenation may be performed. The link layer packet header may include fields for performing concatenation. In concatenation, the input packets may be encapsulated into the payload of the link layer packet in the same order as the original input order.

The link layer packet may include a header and a payload. The header may include a base header, an additional header and/or an optional header. The additional header may be further added according to situation such as concatenation or segmentation and the additional header may include fields suitable for situations. In addition, for delivery of the additional information, the optional header may be further included. Each header structure may be pre-defined. As described above, if the input packets are TS packets, a link layer header having packets different from the other packets may be used.

Hereinafter, link layer signaling will be described.

Link layer signaling may operate at a level lower than that of the IP layer. The reception side may acquire link layer signaling faster than IP level signaling of the LLS, the SLT, the SLS, etc. Accordingly, link layer signaling may be acquired before session establishment.

Link layer signaling may include internal link layer signaling and external link layer signaling. Internal link layer signaling may be signaling information generated at the link layer. This includes the above-described RDT or the below-described LMT. External link layer signaling may be signaling information received from an external module, an external protocol or a higher layer. The link layer may encapsulate link layer signaling into a link layer packet and deliver the link layer packet. A link layer packet structure (header structure) for link layer signaling may be defined and link layer signaling information may be encapsulated according to this structure.

FIG. 7 is a diagram showing a link mapping table (LMT) according to one embodiment of the present invention.

The LMT may provide a list of higher layer sessions carried through the PLP. In addition, the LMT may provide additional information for processing link layer packets carrying the higher layer sessions. Here, the higher layer session may be referred to as multicast. Information on IP streams or transport sessions transmitted through one PLP may be acquired through the LMT. In contrast, information on through which PLP a specific transport session is delivered may be acquired.

The LMT may be transmitted through any PLP identified to deliver the LLS. Here, the PLP for delivering the LLS may be identified by an LLS flag of L1 detail signaling information of a physical layer. The LLS flag may be a flag field indicating whether the LLS is transmitted through a corresponding PLP with respect to each PLP. Here, the L1 detail signaling information may correspond to PLS2 data which will be described later.

That is, the LMT may also be transmitted through the same PLP along with the LLS. Each LMT may describe mapping between PLPs and IP address/port as described above. As described above, the LLS may include an SLT and, in this regard, the IP address/ports described by the LMT may be any IP address/ports related to any service, described by the SLT transmitted through the PLP such as a corresponding LMT.

In some embodiments, the PLP identifier information in the above-described SLT, SLS, etc. may be used to confirm information indicating through which PLP a specific transport session indicated by the SLT or SLS is transmitted may be confirmed.

In another embodiment, the PLP identifier information in the above-described SLT, SLS, etc. will be omitted and PLP information of the specific transport session indicated by the SLT or SLS may be confirmed by referring to the information in the LMT. In this case, the receiver may combine the LMT and other IP level signaling information to identify the PLP. Even in this embodiment, the PLP information in the SLT, SLS, etc. is not omitted and may remain in the SLT, SLS, etc.

The LMT according to the shown embodiment may include a signaling_type field, a PLP_ID field, a num_session field and/or information on each session. Although the LMT of the shown embodiment describes IP streams transmitted through one PLP, a PLP loop may be added to the LMT to describe information on a plurality of PLPs in other embodiments. In this case, as described above, the LMT may describe PLPs of all IP addresses/ports related to all services described by the SLT transmitted together using a PLP loop.

The signaling_type field may indicate the type of signaling information delivered by the table. The value of the signaling type field for the LMT may be set to 0x01. The signaling_type field may be omitted. The PLP_ID field may identify a target PLP to be described. When the PLP loop is used, each PLP_ID field may identify each target PLP. Fields from the PLP_ID field may be included in the PLP loop. Here, the below-described PLP_ID field may be an identifier of one PLP of the PLP loop and the following fields may be fields corresponding to the corresponding PLP.

The num_session field may indicate the number of higher layer sessions delivered through the PLP identified by the PLP_ID field. According to the number indicated by the num_session field, information on each session may be included. This information may include a src_IP_add field, a dst_IP_add field, a src_UDP_port field, a dst_UDP_port field, an SID_flag field, a compressed_flag field, an SID field, and/or a context id field.

The src_IP_add field, the dst_IP add field, the src_UDP_port field, and the dst_UDP_port field may indicate the source IP address, the destination IP address, the source UDP port and the destination UDP port of the transport session among the higher layer sessions delivered through the PLP identified by the PLP_ID field.

The SID_flag field may indicate whether the link layer packet delivering the transport session has an SID field in the optional header. The link layer packet delivering the higher layer session may have an SID field in the optional header and the SID field value may be equal to that of the SID field in the LMT.

The compressed_flag field may indicate whether header compression is applied to the data of the link layer packet delivering the transport session. In addition, presence/absence of the below-described context_id field may be determined according to the value of this field. When header compression is applied (compressed_flag=1), the RDT may be present and the PLP ID field of the RDT may have the same value as the corresponding PLP_ID field related to the present compressed_flag field.

The SID field may indicate a sub stream ID (SID) of link layer packets for delivering a corresponding transfer session. The link layer packets may include the SID having the same value as the present SID field in the optional header. Thereby, the receiver may filter link layer packets using information of the LMT and SID information of a link layer packet header without parsing all link layer packets.

The context_id field may provide a reference for a context id (CID) in the RDT. The CID information of the RDT may indicate the context ID of the compression IP packet stream. The RDT may provide context information of the compression IP packet stream. Through this field, the RDT and the LMT may be associated.

In the above-described embodiments of the signaling information/table of the present invention, the fields, elements or attributes may be omitted or may be replaced with other fields. In some embodiments, additional fields, elements or attributes may be added.

In one embodiment of the present invention, service components of one service may be delivered through a plurality of ROUTE sessions. In this case, an SLS may be acquired through bootstrap information of an SLT. An S-TSID and an MPD may be referenced through the USBD of the SLS. The S-TSID may describe not only the ROUTE session delivered by the SLS but also transport session description information of another ROUTE session carried by the service components. To this end, the service components delivered through the plurality of ROUTE sessions may all be collected. This is similarly applicable to the case in which the service components of one service are delivered through a plurality of MMTP sessions. For reference, one service component may be simultaneously used by the plurality of services.

In another embodiment of the present invention, bootstrapping of an ESG service may be performed by a broadcast or broadband network. By acquiring the ESG over broadband, URL information of the SLT may be used. ESG information may be requested using this URL.

In another embodiment of the present invention, one service component of one service may be delivered over the broadcast network and the other service component may be delivered over broadband (hybrid). The S-TSID may describe components delivered over the broadcast network such that the ROUTE client acquires desired service components. In addition, the USBD may have base pattern information to describe which segments (which components) are delivered through which path. Accordingly, the receiver can confirm a segment to be requested from the broadband service and a segment to be detected in a broadcast stream.

In another embodiment of the present invention, scalable coding of a service may be performed. The USBD may have all capability information necessary to render the service. For example, when one service is provided in HD or UHD, the capability information of the USBD may have a value of "HD or UHD". The receiver may check which component is reproduced in order to render the UHD or HD service using the MPD.

In another embodiment of the present invention, through a TOI field of the LCT packets delivered through the LCT channel delivering the SLS, which SLS fragment is delivered using the LCT packets (USBD, S-TSID, MPD, etc.) may be identified.

In another embodiment of the present invention, app components to be used for app based enhancement/an app based service may be delivered over the broadcast network as NRT components or may be delivered over broadband. In addition, app signaling for app based enhancement may be performed by an application signaling table (AST) delivered along with the SLS. In addition, an event which is signaling for operation to be performed by the app may be delivered in the form of an event message table (EMT) along with the SLS, may be signaled in the MPD or may be in-band signaled in the form of a box within DASH representation. The AST, the EMT, etc. may be delivered over broadband. App based enhancement, etc. may be provided using the collected app components and such signaling information.

In another embodiment of the present invention, a CAP message may be included and provided in the above-described LLS table for emergency alert. Rich media content for emergency alert may also be provided. Rich media may be signaled by a CAP message and, if rich media is present, the rich media may be provided as an EAS service signaled by the SLT.

In another embodiment of the present invention, linear service components may be delivered over the broadcast network according to the MMT protocol. In this case, NRT data (e.g., app components) of the service may be delivered over the broadcast network according to the ROUTE protocol. In addition, the data of the service may be delivered over broadband. The receiver may access the MMTP session delivering the SLS using the bootstrap information of the SLT. The USBD of the SLS according to the MMT may reference the MP table such that the receiver acquires linear service components formatted into the MPU delivered according to the MMT protocol. In addition, the USBD may further reference the S-TSID such that the receiver acquires NRT data delivered according to the ROUTE protocol. In addition, the USBD may further reference the MPD to provide a reproduction description of data delivered over broadband.

In another embodiment of the present invention, the receiver may deliver location URL information capable of acquiring a file content item (file, etc.) and/or a streaming component to a companion device through a web socket method. The application of the companion device may acquire components, data, etc. through a request through HTTP GET using this URL. In addition, the receiver may deliver information such as system time information, emergency alert information, etc. to the companion device.

Figure 8:
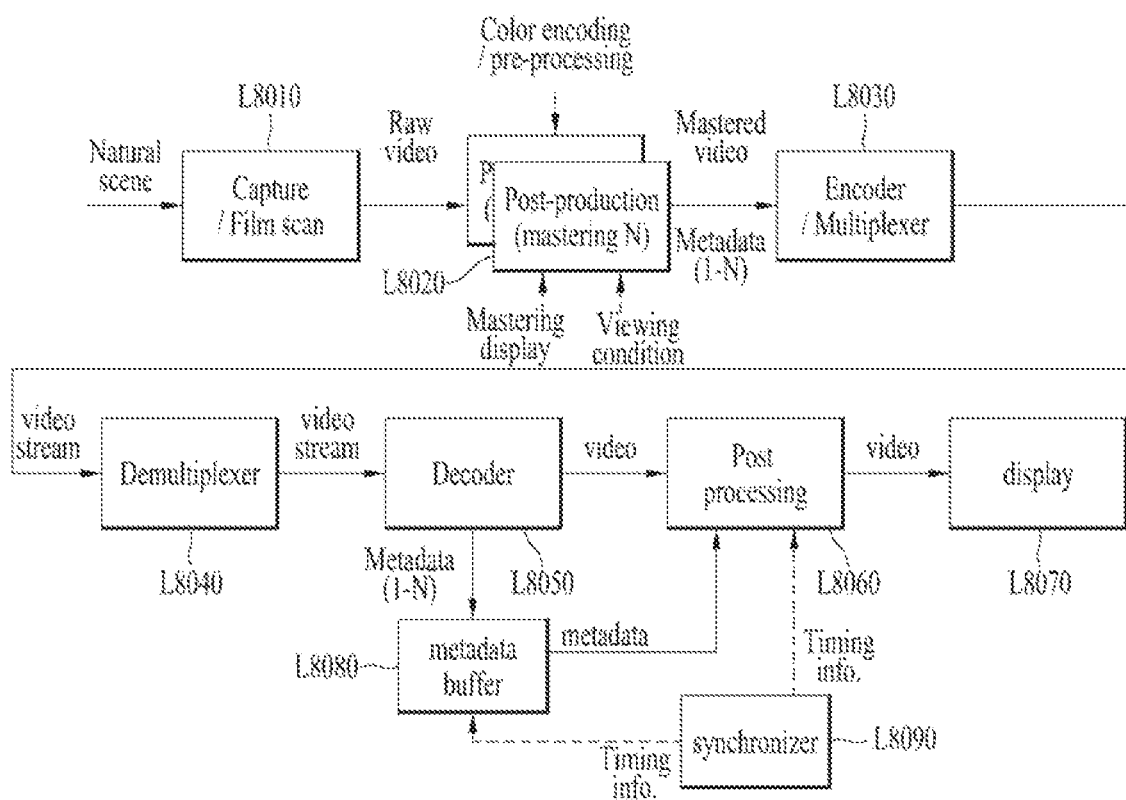
FIG. 8 is a diagram showing a structure of a broadcast signal transmission device with respect to a next-generation broadcast service according to an embodiment of the present invention.

FIG. 8 is a diagram illustrating a configuration of a transceiving system for HDR broadcast services based on a plurality of pieces of metadata according to an embodiment of the present invention.

According to an embodiment of the present invention, a broadcast system provides a method of transmitting a plurality of elements, by which content can be adaptively adjusted depending on properties of various scenes, to a receiving end.

UHD broadcast systems can represent brightness that cannot be represented in conventional content to differentiate broadcast content from conventional content and to provide a high degree of realism. Particularly, as a presentation range of images increases according to introduction of a video quality element such as a high dynamic range (HDR), property differences between pieces of content further increase. A broadcast system according to an embodiment of the present invention can provide information for effectively presenting properties of scenes on a display and a receiver can provide video effects on the basis of the information such that a user can enjoy images through a method adapted to intention of a producer.

The broadcast system according to an embodiment of the present invention provides a method of providing broadcast services when a transmitting end delivers video quality enhancement information and a method of operating a receiver according thereto. According to an embodiment of the present invention, various intentions of a producer can be reflected in the video quality enhancement information for high definition image services.

The broadcast system according to an embodiment of the present invention provides a method of signaling information representing a relationship between a plurality of pieces of metadata delivered by a transmitting end and a receiver structure according thereto. According to an embodiment of the present invention, a plurality of pieces of metadata delivered by the transmitting end may be classified into one or more categories according to metadata_type and classified into a category according to metadata_sub_type. In addition, a relationship between pieces of metadata in a category may be represented according to exclusive flag.

The broadcast system according to an embodiment of the present invention provides a method of signaling the position of metadata containing actual information and a receiver structure according thereto.

The broadcast system according to an embodiment of the present invention provides broadcast services which provide a plurality of pieces of metadata for the purpose of enhancing video quality. For example, the broadcast system according to an embodiment of the present invention can provide an HDR broadcast service based on a plurality of pieces of metadata. According to an embodiment of the present invention, a plurality of pieces of metadata may be delivered according to purpose, method and/or area division. The broadcast system according to an embodiment of the present invention provides a plurality of pieces of metadata such that a receiver can selectively use metadata suitable to properties thereof. According to an embodiment of the present invention, metadata may be processed through an additional processing procedure. A receiver according to an embodiment of the present invention may perform post-processing with reference to metadata to provide content having enhanced video quality.

This figure shows a structure of the broadcast system according to an embodiment of the present invention. The broadcast system according to an embodiment of the present invention includes a capture/film scan unit L8010, a post-production (mastering) unit L8020, an encoder/multiplexer L8030, a demultiplexer L8040, a decoder L8050, a post-processing unit L8060, a display L8070, a metadata buffer L8080 and/or a synchronizer L8090. The capture/film scan unit L8010 captures and scans natural scenes to generate raw video. The post-production (mastering) unit L8020 masters video to generate mastered video and metadata for signaling properties of the mastered video. Here, to master video, information representing properties of a mastering display, information representing a viewing condition, color encoding information, information about a target display and/or information necessary for pre-processing of content may be used. According to an embodiment of the present invention, the post-processing procedure may be performed once or more. That is, the mastering process can be performed once or more and different mastered videos and metadata can be generated according to mastering conditions whenever post production is performed. The encoder/multiplexer L8030 encodes the mastered video to generate video streams and multiplexes the video streams with other streams to generate broadcast streams. The demultiplexer L8040 receives the broadcast streams and demultiplexes the broadcast streams to generate video streams. The decoder L8050 decodes the video streams to output video and metadata. The metadata buffer L8080 receives the metadata and delivers the metadata to the post-processing unit. The synchronizer L8090 delivers timing information to the metadata buffer and the post-processing unit. The post-processing unit L8060 post-processes the video delivered from the decoder using the metadata and/or the timing information. The display L8070 displays the post-processed video.

Figure 9:
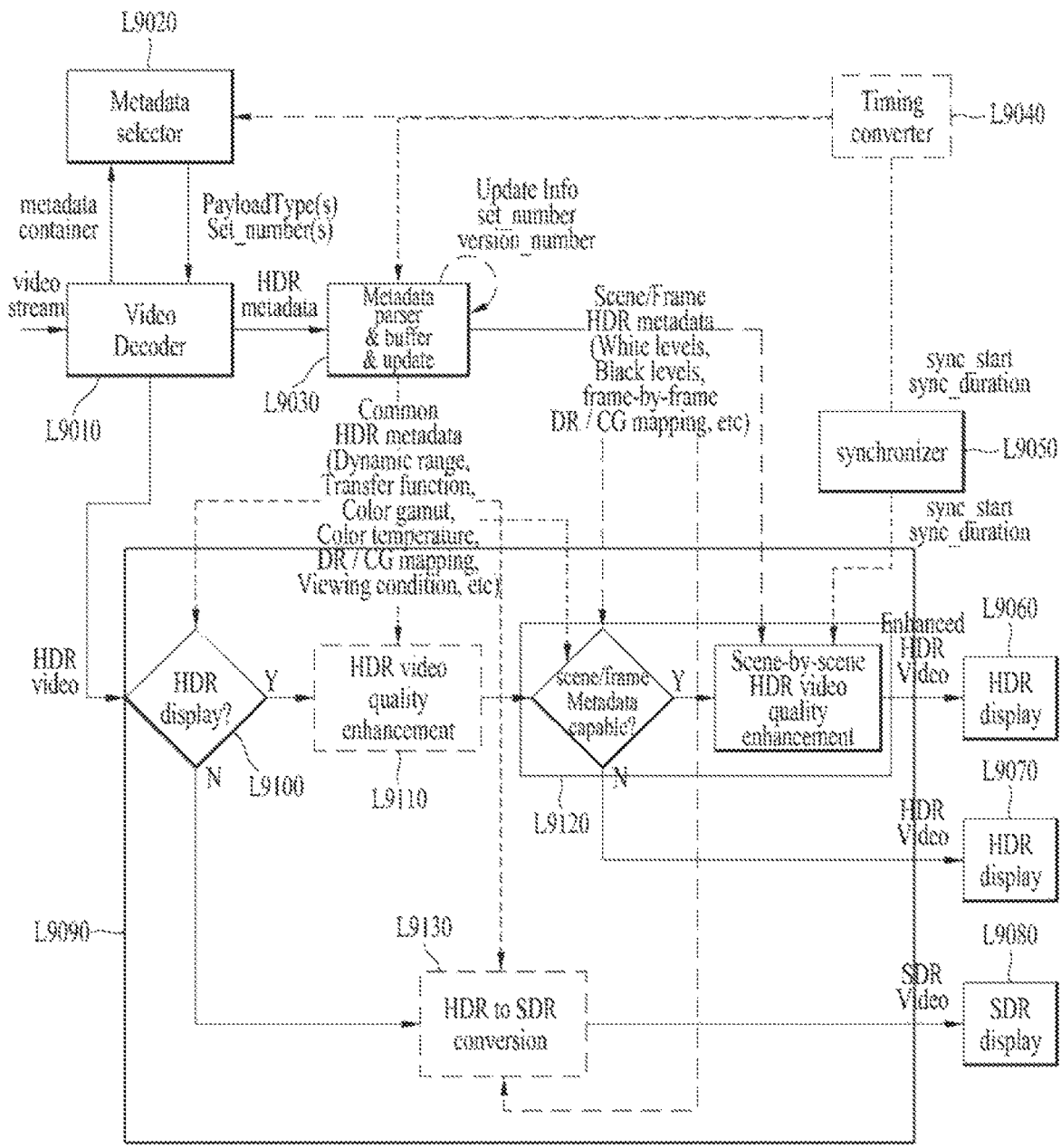
FIG. 9 is a diagram showing a configuration of a receiver which processes a plurality of pieces of metadata according to an embodiment of the present invention.

FIG. 9 illustrates a configuration of a receiver which processes a plurality of pieces of metadata according to an embodiment of the present invention.

The broadcast system according to an embodiment of the present invention can deliver a metadata container including a plurality of pieces of metadata and provide an operating method of a receiver when the plurality of pieces of metadata includes information for HDR video processing. This figure shows a receiver operation in the above-described embodiment.

In the specification, the receiver operation to which the present invention is applied is mainly described. However, details of signaling information which causes the receiver operation may be applied to a transmitter and the signaling information may also be applied to a case in which signals are exchanged in a production process and/or a mastering process. Further, the signaling information may be applied when information is exchanged between a source device and a sink device.

According to an embodiment of the present invention, a metadata container and actual metadata may be delivered as separate SEI messages. According to another embodiment of the present invention, both the metadata container and actual metadata may be included in one SEI message. According to an embodiment of the present invention, system metadata may signal details of the metadata container, and the broadcast system may signal that a receiver needs to appropriately select metadata from a plurality of pieces of metadata transmitted thereto with reference to the details of the metadata container because the plurality of pieces of metadata is delivered.

A receiver according to an embodiment of the present invention includes a video decoder L9010, a metadata selector L9030, a timing converter L9040, a synchronizer L9050, a post-processing unit L9090, a first HDR display L9060, a second HDR display L9070 and/or an SDR display L9080. The first post-processing unit L9090 includes an HDR display determination unit L9100, a first HDR video quality enhancement unit L9110, a second HDR video quality enhancement unit L9120 and/or a conversion unit L9130. The aforementioned first post-processing unit L9090 is the same as the post-processing unit described above with reference to the previous figure.

According to an embodiment of the present invention, the video decoder may receive a video stream, separate metadata from the video stream and store the metadata in a buffer. According to an embodiment of the present invention, the metadata selector may select only metadata necessary for the receiver on the basis of information included in a metadata container. Accordingly, the video decoder can receive information about metadata necessary for the receiver from the metadata selector, separate only the metadata necessary for the receiver from the video stream using the information and store the metadata in a separate buffer according to an embodiment of the present invention.

According to an embodiment of the present invention, the video decoder decodes the video stream, and when the video stream includes a metadata container descriptor, parses a metadata container SEI message in the video stream and delivers the parsed metadata container SEI message to the metadata selector. Here, the metadata container descriptor is included in the metadata container SEI message and delivered. The metadata selector can identify the type of metadata using metadata type information included in the metadata container.

According to an embodiment of the present invention, when the HDR service is provided, metadata can include mastering display metadata for HDR processing, mastering viewing condition metadata and/or specific image conversion information. Here, the mastering display metadata represents information about a mastering display used when content mastering is performed. The mastering viewing condition metadata represents information about a viewing condition referred to when content mastering is performed.

According to an embodiment of the present invention, metadata (e.g., metadata_type=0010) necessary for image conversion processing according to a target display and/or metadata (e.g., metadata_type=0100) necessary when different HDR services are provided according to mastering methods may be transmitted through one SEI message or different SEI messages.

According to an embodiment of the present invention, metadata classified according to metadata type information may be sub-divided according to metadata sub type information metadata_sub_type. That is, metadata is categorized according to the metadata type information and sub-divided in one category according to the metadata sub-type information. Here, the broadcast system can signal whether there is a sub-type in metadata classified according to the metadata type information using metadata sub-type flag information metadata_sub_type_flag.

According to an embodiment of the present invention, when the category of metadata that can be used in the corresponding service is identified through a metadata container descriptor, a metadata selector may determine whether all pieces of metadata in one category identified by metadata type information need to be used or only one piece of metadata in the category can be used through exclusive flag information exclusive_flag. Furthermore, the metadata selector may determine whether metadata necessary for the corresponding service and/or the corresponding receiver changes in predetermined units using metadata change flag information metadata_change_flag. The metadata selector may deliver information about metadata necessary for the corresponding service and/or the corresponding receiver to a decoder when the category of metadata, the number of pieces of metadata necessary in the category and/or whether the corresponding metadata changes are determined.

According to an embodiment of the present invention, when information in the metadata container descriptor is processed by the metadata selector, the receiver can perform video quality processing of content according to metadata selected by the metadata selector.

According to an embodiment of the present invention, an HDR display determination unit may receive decoded HDR video from a video decoder, receive common HDR metadata from a metadata parser and determine whether the display of the receiver is an HDR display capable of processing the received HDR video using the received HDR metadata. Here, the HDR metadata may include dynamic range information of content/container, transfer function information necessary when the dynamic range of the content/container is changed, color gamut information of the content/container, color temperature information of the content/container, dynamic range/color gamut mapping information and/or viewing condition information. A first HDR video quality enhancement unit may perform video quality enhancement processing of the HDR video using the HDR metadata when the display of the receiver is an HDR display. A second HDR video quality enhancement unit may determine whether metadata per scene or frame is applicable to the HDR video and the receiver using the HDR metadata, HDR metadata per scene and/or HDR metadata per frame and perform video quality enhancement processing per scene or frame when the metadata is applicable thereto. Here, synchronization information (sync_start and/or sync_duration) delivered from a timing converter and a synchronization unit may be used. HDR video which has been subjected to video quality enhancement processing by the first HDR video quality enhancement unit and the second HDR video quality enhancement unit may be displayed on a first HDR display and HDR video which has been subjected to video quality enhancement processing only by the first HDR video quality enhancement unit may be displayed on a second HDR display. Furthermore, a conversion unit may covert the HDR video into SDR video using the HDR metadata, the HDR metadata per scene and/or the HDR metadata per frame when the display of the receiver is not an HDR display. In addition, the converted SDR video may be displayed on an SDR display.

Figure 10:
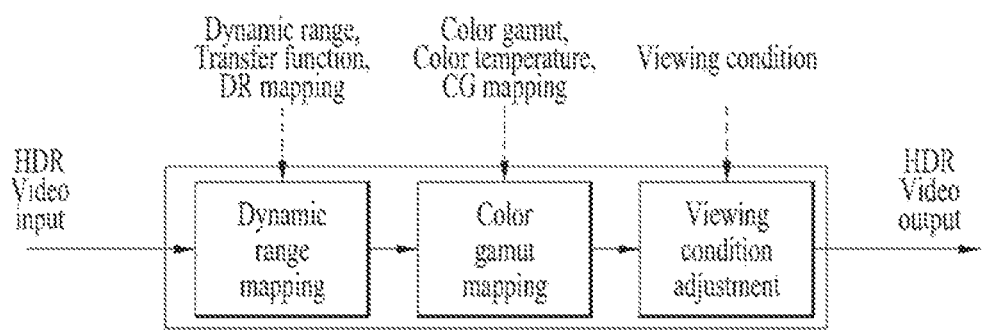
FIG. 10 is a diagram showing a specific configuration of a first HDR video quality enhancement unit according to an embodiment of the present invention.

FIG. 10 is a diagram showing a specific configuration of the first HDR video quality enhancement unit according to an embodiment of the present invention.

According to an embodiment of the present invention, the first HDR video quality enhancement unit may include a dynamic range mapping unit, a color gamut mapping unit and/or a viewing condition adjustment unit. The dynamic range mapping unit may adjust the dynamic range of HDR video in consideration of the display of the receiver using dynamic range information of the content/container, transfer function information necessary when the dynamic range of the content/container is changed and/or dynamic range mapping information included in the HDR metadata. The color gamut mapping unit may adjust the color gamut of HDR video in consideration of the display of the receiver using color gamut information of the content/container, color temperature information of the content/container and/or color gamut mapping information included in the HDR metadata. The viewing condition adjustment unit may adjust HDR video in consideration of the display of the receiver and a viewing condition using viewing condition information included in the HDR metadata.

FIG. 11 is a diagram showing a configuration of a metadata container descriptor according to an embodiment of the present invention.

According to an embodiment of the present invention, when various types of metadata with respect to one stream, scene or image are simultaneously delivered, the broadcast system may provide signaling for applying corresponding metadata selectively or in a predetermined order according to the purpose of each piece of metadata.

For example, the broadcast system may deliver static metadata applied to entire content and dynamic metadata changing with time and deliver only HDR conversion information corresponding to a target display to consider various display performances or deliver different pieces of HDR conversion information according to target displays such that the receiver can selectively use only necessary information in the case of the HDR service. The broadcast system may deliver information for different processes depending on local features in one frame and information for different processes depending on respective views in the case of a multi-view image. Furthermore, the broadcast system may use the metadata container descriptor when a plurality of pieces of metadata needs to be applied in a predetermined order.

Metadata container information of the metadata container descriptor according to an embodiment of the present invention may be used in production, post-production and/or distribution processes. In this case, the information of the metadata container descriptor may be included in a transmission format used in each process and delivered according to each process. For example, when the information of the metadata container descriptor is used in a video coding process, the information may be defined in an SEI message.

The metadata container descriptor L11010 according to an embodiment of the present invention may be included in a metadata container SEI message (payloadType=53, L11020).

Metadata container information included in the metadata container descriptor according to an embodiment of the present invention may include number_of metadata_types, metadata_type, exclusive_metadata_flag, number_of_metadata, metadata_sub_type_flag, metadata_PayloadType, metadata_set_number, metadata_version_number, metadata_change_flag, metadata_sub_type, exclusive_metadata_flag, number_of_metadata, metadata_PayloadType, metadata_set_number, metadata_version_number, metadata_change_flag and/or program_reset_flag.

Number_of metadata_types indicates the number of metadata types.

Metadata_type indicates metadata types included in the metadata container. This field can classify metadata types on the basis of the use of metadata (mastering display, mastering viewing condition) and classify metadata types on the basis of metadata application conditions (target, method, local feature, view). Further, this field can be used to describe a metadata application order. According to an embodiment of the present invention, this field indicates that corresponding metadata is metadata with respect to mastering display color volume when set to 0000, indicates that the corresponding metadata is metadata with respect to a mastering viewing condition referred to in a mastering process when set to 0001, indicates that the corresponding metadata is metadata applied to a specific target display when set to 0010 (category 1: target dependent), indicates that the corresponding metadata is metadata applied to a local feature of a specific transmission/reception area when set to 0011 (category 2: local feature dependent), indicates that the corresponding metadata is metadata applied to a specific mastering method when set to 0100 (category 3: method dependent) and indicates that the corresponding metadata is metadata applied to a specific view in a multi-view service when set to 0101 (category 4: view dependent).

Exclusive_metadata_flag indicates whether a plurality of pieces of metadata defined in metadata_type is selectively used or all of the pieces of metadata defined in metadata_type are used. This field indicates that only one of a plurality of pieces of metadata belonging to the same category is selectively used when set to 1 and indicates that all of a plurality of pieces of metadata belonging to the same category are used when set to 0. For example, when content is processed by applying different pieces of metadata in a specific category thereto, this field can be set to 0 to signal that entire metadata of the category needs to be used.

Number_of metadata indicates the number of pieces of metadata classified in the corresponding metadata type. That is, this field indicates the number of pieces of metadata included in a category identified by metadata type information.

Metadata_sub_type_flag indicates whether there is a sub-type that classifies metadata in the corresponding metadata type. This field represents that there is a sub-type when set to 1 and represents that there is no sub-type when set to 0.

Metadata_sub_type indicates the type of metadata included in the corresponding metadata type. According to an embodiment of the present invention, values of this field and meaning thereof may be the same as metadata_type.

Metadata_PayloadType indicates a position at which the corresponding metadata is transmitted. This field indicates a payload type value of an SEI message carrying the corresponding metadata as linkage information about the corresponding metadata. A receiver according to an embodiment of the present invention may detect an SEI message in which corresponding metadata is transmitted to acquire the corresponding metadata using the value represented by this field.

Metadata_set_number represents a metadata identification number. This field identifies a plurality of pieces of metadata when the plurality of pieces of metadata is transmitted. This field may have a unique value in a program. According to an embodiment of the present invention, consecutive set numbers may be defined for a plurality of pieces of metadata and a section to which corresponding metadata is applied in metadata container information can be signaled using the set numbers.

Metadata_version_number indicates a version number of corresponding metadata. The receiver can recognize whether information in the corresponding metadata has changed using this field. This field can be used to signal whether information in the corresponding metadata has been updated in advance.

Metadata_change_flag indicates whether information in the corresponding metadata is information changing in specific units (e.g., program unit, RAP unit, specific time unit, etc.) or information that does not change and remains. For example, this field indicates that the information in the corresponding metadata changes in predetermined units in a program (e.g., unit such as a frame, a scene and the like according to timeline) when set to 1 and the receiver can recognize that the corresponding information needs to be continuously updated in a determined period.

Program_reset_flag indicates whether all information described by the corresponding metadata container information has changed. This field can be set to 1 when all information in metadata has changed due to start of a new program or the like. The receiver can reset a metadata buffer when this field is set to 1.

Figure 12:
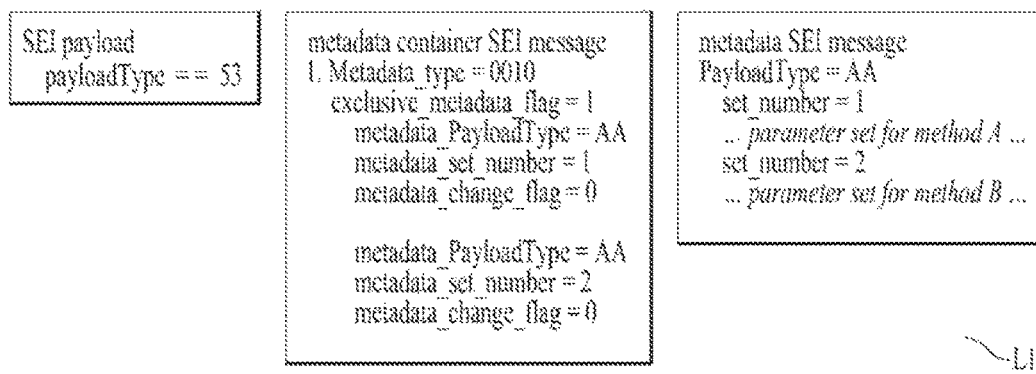
FIG. 12 is a diagram showing description of a metadata_type field according to an embodiment of the present invention.

FIG. 12 is a diagram showing description of the metadata_type field according to an embodiment of the present invention.

This figure shows values of the metadata_type field included in the metadata container information and description of the values. The values have been described in detailed with reference to previous figures.

Figure 13:
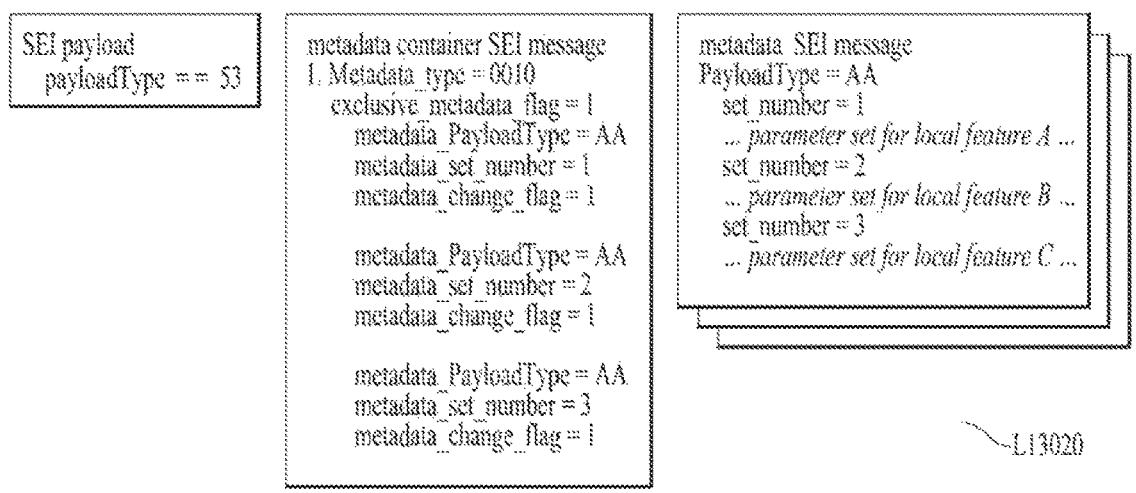
FIG. 13 is a diagram showing a usage example of metadata container information according to an embodiment of the present invention.

FIG. 13 is a diagram showing a usage example of the metadata container information according to an embodiment of the present invention.

L13010 illustrates an embodiment of signaling a case in which a processing method (metadata_type=0010) for different target displays is described in metadata having one payload through metadata container information. In this embodiment, the metadata corresponds to metadata that does not change in predetermined units in a program (metadata_change_flags=0). According to this embodiment, pieces of metadata about respective features are included in metadata having the same payload and may be identified by set numbers.

L13020 illustrates an embodiment of signaling a case in which a processing method (metadata_type=0010) for different target displays is described in metadata having one payload through metadata container information. In this embodiment, the metadata corresponds to metadata changing in predetermined units in a program (metadata_change_flags=1). According to this embodiment, pieces of metadata about respective features are included in metadata having the same payload and may be identified by set numbers.

According to the embodiment L13010, metadata included in a metadata container SEI message is metadata dependent on a target display (metadata_type=0010). Further, pieces of metadata having the aforementioned metadata type are simultaneously used instead of being selectively used (exclusive_metadata flag=1). Metadata identified by the metadata_set_number field set to 1 corresponds to metadata that does not change in predetermined units in a program (metadata_change_flag=0) and is delivered through an SEI message identified by PayloadType=AA. Metadata identified by the metadata_set_number field set to 2 corresponds to metadata that does not change in predetermined units in a program (metadata_change_flag=0) and is delivered through an SEI message identified by PayloadType=AA. According to this embodiment, the SEI message carrying the corresponding metadata has PayloadType=AA and includes metadata (set_number=1) indicating a parameter set for mastering method A and metadata (set_number=2) indicating a parameter set for mastering method B.

According to the embodiment L13020, metadata included in a metadata container SEI message is metadata dependent on a target display (metadata_type=0010). Further, pieces of metadata having the aforementioned metadata type are simultaneously used instead of being selectively used (exclusive_metadata_flag=1). Metadata identified by the metadata_set_number field set to 1 corresponds to metadata that changes in predetermined units in a program (metadata change_flag=1) and is delivered through an SEI message identified by PayloadType=AA. Metadata identified by the metadata_set_number field set to 2 corresponds to metadata that changes in predetermined units in a program (metadata_change_flag=1) and is delivered through an SEI message identified by PayloadType=AA. Metadata identified by the metadata_set_number field set to 3 corresponds to metadata that changes in predetermined units in a program (metadata_change_flag=1) and is delivered through an SEI message identified by PayloadType=AA. According to this embodiment, the SEI message carrying the corresponding metadata has PayloadType=AA and includes metadata (set_number=1) indicating a parameter set for local feature A, metadata (set_number=2) indicating a parameter set for local feature B and metadata (set_number=3) indicating a parameter set for local feature C.

FIG. 14 is a diagram showing a usage example of the metadata container information according to another embodiment of the present invention.

According to an embodiment L14010 of the present invention, a metadata container SEI message includes information about metadata (metadata_type=0010) depending on a target display and information about mastering display metadata (mastering display color volume metadata, metadata_type=0000).

According to this embodiment, when metadata_type=0000, only one piece of metadata having this type is present in the metadata container SEI message and thus the exclusive_metadata_flag field has a value of 0. The metadata having the corresponding type is delivered through a mastering display metadata SEI message identified by PayloadType=137 (metadata_PayloadType=137). Since one piece of metadata having the corresponding type is delivered through one SEI message, the set number of the metadata having the type is 1 (metadata_set_number=1). The metadata having the corresponding type is not metadata that changes in predetermined units in a program (metadata_change_flag=0).

According to this embodiment, when metadata_type=0010, two pieces of metadata having the corresponding type are present in the metadata container SEI message. Here, the two pieces of metadata having the type are selectively used (exclusive_metadata_flag=1). According to this embodiment, first metadata is delivered through a metadata SEI message identified by PayloadType=AA (metadata_PayloadType=AA). This metadata SEI message carries only the first metadata, and thus the set number of the first metadata is 1 (metadata_set_number=1). The first metadata is not metadata that changes in predetermined units in a program (metadata_change flag=0). According to this embodiment, second metadata is delivered through a metadata SEI message_identified by PayloadType=BB (metadata_PayloadType=BB). This metadata SEI message carries only the second metadata, and thus the set number of the second metadata is 1 (metadata_set_number=1). The second metadata is metadata that changes in predetermined units in a program (metadata_change_flag=1).

According to this embodiment, the mastering display metadata SEI message has PayloadType=137 and includes mastering display metadata (set_number=1). The metadata SEI message carrying the first metadata has PayloadType=AA and includes the first metadata (set_number=1) indicating a parameter set for mastering method A. The metadata SEI message carrying the second metadata has PayloadType=BB and includes the second metadata (set_number=1) indicating a parameter set for mastering method B. According to an embodiment of the present invention, since the first metadata and the second metadata having the same type are discriminated from each other through PayloadType, different payloads (PayloadType=AA and BB in this embodiment) can be predefined.

According to another embodiment L14020 of the present invention, the metadata container SEI message includes information about metadata (metadatatype=0010) dependent on a target display and/or information about metadata (metadata_sub_type=0011) dependent on local features.

According to this embodiment, when metadata_type=0010, only one piece of metadata having the corresponding type is present in the metadata container SEI message and thus the exclusive_metadata_flag field may have any value but has a value of 1 in this embodiment. The metadata having the corresponding type is delivered through a metadata SEI message identified by PayloadType=AA (metadata_PayloadType=AA). Since one piece of metadata having the corresponding type is delivered through one SEI message, the set number of the metadata having the type is 1 (metadata_set_number=1). The metadata having the corresponding type is not metadata that changes in predetermined units in a program (metadata_change_flag=0).

According to this embodiment, when metadata_sub_type=0011, three pieces of metadata having the corresponding type are present in the metadata_type field. Here, the three pieces of metadata having the corresponding type are simultaneously used instead of being selectively used (exclusive_metadata_flag=0). According to this embodiment, first metadata is delivered through a metadata SEI message identified by PayloadType=BA (metadata_PayloadType=BA). This metadata SEI message carries only the first metadata, and thus the set number of the first metadata is 1 (metadata set_number=1). The first metadata is metadata that changes in predetermined units in a program (metadata_change_flag=1). According to this embodiment, second metadata is delivered through a metadata SEI message identified by PayloadType=BB (metadata_PayloadType=BB). This metadata SEI message carries only the second metadata, and thus the set number of the second metadata is 1 (metadata_set_number=1). The second metadata is metadata that changes in predetermined units in a program (metadata_change_flag=1). According to this embodiment, third metadata is delivered through a metadata SEI message identified by PayloadType=BC (metadata_PayloadType=BC). This metadata SEI message carries only the third metadata, and thus the set number of the third metadata is 1 (metadata_set_number=1). The third metadata is metadata that changes in predetermined units in a program (metadata_change_flag=1).

According to this embodiment, the metadata SEI message carrying metadata having metadata_type=0010 has PayloadType=AA and includes the metadata (set_number=1) indicating a parameter set for mastering method A. The metadata SEI message carrying the first metadata has PayloadType=BA and includes the second metadata (set_number=1) indicating a parameter set for mastering method BA. The metadata SEI message carrying the second metadata has PayloadType=BB and includes the second metadata (set_number=1) indicating a parameter set for mastering method BB. The metadata SEI message carrying the third metadata has PayloadType=BC and includes the third metadata (set_number=1) indicating a parameter set for mastering method BC.

In embodiment L14010, a case in which a processing method (metadata_type=0010) for different target displays is described in metadata having different payloads (PayloadType AA and BB) is signaled through metadata container information. According to this embodiment, the metadata container information can simultaneously signal information about different pieces of metadata (mastering display color volume metadata) used in the corresponding program.

In embodiment L14020, a case in which a local feature based processing method is defined through metadata_sub_type in a processing method (metadata_type=0010) for different target displays is signaled through metadata container information. Referring to this figure, since exclusive_metadata flag=0, all pieces of metadata corresponding to metadata_sub_type=0011 are used to process information in a frame. For example, when areas are divided depending on features, respective pieces of metadata are delivered through PayloadTypes BA, BB and BC and the receiver can acquire specific information about methods of identifying and processing each area through information in each piece of metadata. Furthermore, the receiver processes pixels in a frame using the entire information in the three pieces of metadata.

FIG. 15 is a diagram showing a case in which metadata container information according to an embodiment of the present invention is signaled through a PMT (Program Map Table).

The broadcast system according to an embodiment of the present invention can signal metadata container information using a PMT and/or EIT (Event Information Table) of a system level as well as an SEI message and signal that the corresponding service is a UHD service using the metadata container information.

The metadata container information according to an embodiment of the present invention may be included in a stream-level descriptor of the PMT in the form of a descriptor (metadata_container_descriptor).

UHD_program_info_descriptor according to an embodiment of the present invention may be included in a program-level descriptor of the PMT. UHD_program_info_descriptor includes descriptor_tag, descriptor_length and/or UHD_service_type fields. Descriptor_tag indicates that the corresponding descriptor is UHD_program_info_descriptor. Descriptor_length indicates the length of the corresponding descriptor. UHD_service_type indicates a service type. UHD_service_type indicates UHD1 when set to 0000, indicates UHD2 when set to 0001, indicates reserved when set to 00100111, and indicates user private when set to 10001111. UHD_service_type according to an embodiment of the present invention provides information about UHD service types (e.g., UHD service types designated by a user, such as UHD1 (4K), UHD2 (8K) and types depending on video quality). Accordingly, the broadcast system according to an embodiment of the present invention can designate XXXX (UHD1 service with a plurality of pieces of metadata, an example of 4K) with the value of UHD_service_type to signal that various types of metadata for video processing are delivered and thus a receiver can use a plurality of pieces of metadata selectively or in an integrated manner.

The PMT according to an embodiment of the present invention includes a table_id field, a section_syntax_indicator field, a section_length field, a program_number field, a version_number field, a current_next_indicator field, a section_number field, a last_section_number field, a PCR_PID field, a program_info_length field, descriptor( ) a stream_type field, an elementary_PID field, an ES_info_length field, descriptor( ) and/or a CRC_32 field. The table_id field identifies the type of the table. The table_id field can indicate that the corresponding table section is a section constituting the PMT. The section_syntax_indicator field indicates the format of a table section following this field. This field indicates that the corresponding table section has a short format when set to 0 and indicates that the corresponding table section has a normal long format when set to 1. The section_length field indicates the length of the corresponding table section. The section_length field indicates the length from the end of this field to the end of the corresponding table section, and thus the actual length of the corresponding table section can be a value obtained by adding 3 bytes to the value indicated by the section_length field. The program_number field identifies each program service or virtual channel present in a transport stream. The version_number field indicates a version umber of a private table section. A receiver can detect the most recent table section from among table sections stored in a memory using this field and the current_next_indicator field which will be described later. The current_next_indicator field indicates that the currently delivered table is valid when set to 1 and indicates that the currently delivered table is not valid at present but will be valid later when set to 0. The section_number field indicates the order of the corresponding section in the corresponding table. The last section_number field indicates the order of the last section among sections constituting the corresponding table. The PCR_PID field indicates a packet ID corresponding to a PCR (Program Clock Reference) for program service. The program_info_length field indicates the length of the following descriptor indicating program information. Descriptor( ) refers to a descriptor indicating information about a program corresponding to the table section. According to an embodiment of the present invention, the descriptor may include UHD_program_info_descriptor( ) which identifies UHD service type. The stream_type field indicates the type of each unit stream constituting the program described by the table. The elementary_PID field indicates a packet ID of each unit stream constituting the program described by the table. The ES_info_length field indicates the length of the following descriptor indicating information ES_info about each unit stream. Descriptor( ) refers to a descriptor indicating information about one of unit streams constituting the program described by the table. The CRC_32 field indicates a CRC value used to check whether data included in the corresponding table section has an error. The PMT according to an embodiment of the present invention may be delivered in-band through MPEGTS and PSI information including the PMT may be delivered through IP in the form of xml.

Figure 16:
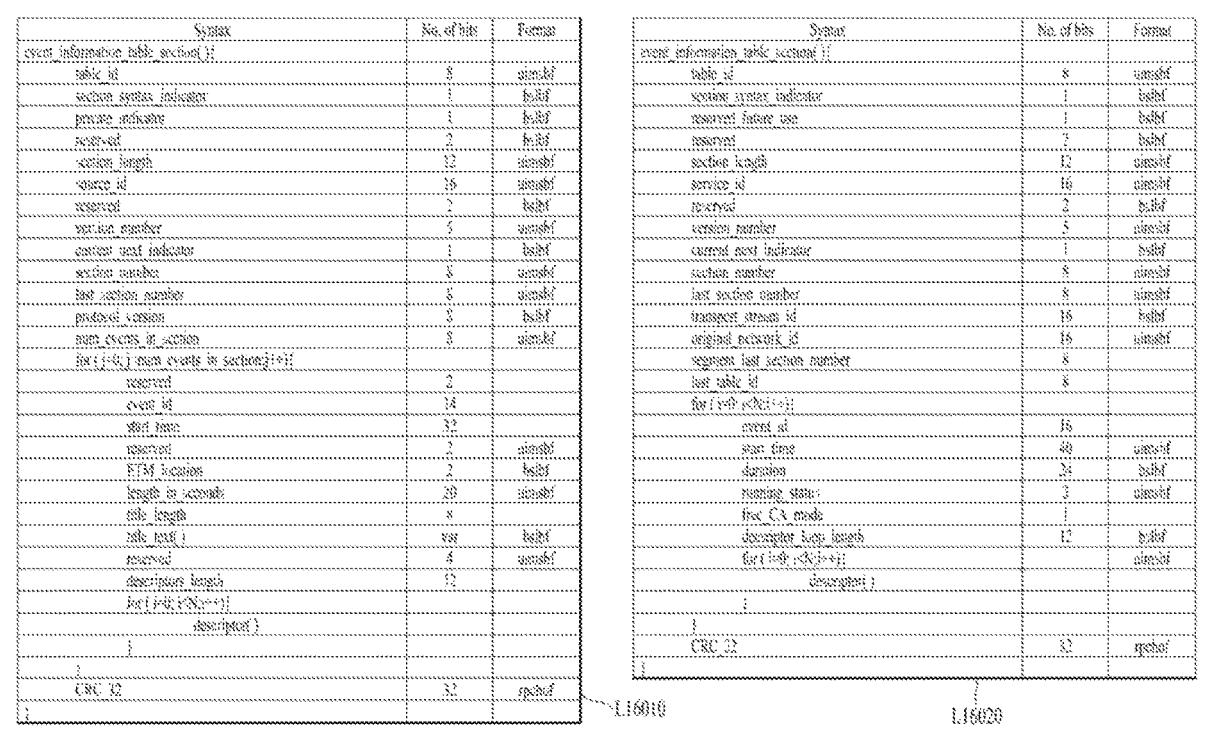

FIG. 16 is a diagram for describing a case in which the metadata container information according to an embodiment of the present invention is signaled through the EIT.

The metadata container information according to an embodiment of the present invention may be included in an event-level descriptor of the EIT in the form of a descriptor (metadata_container_descriptor). Further, the aforementioned UHD_program_info_descriptor may be included in the event-level descriptor of the EIT.

The receiver according to an embodiment of the present invention may recognize that a plurality of pieces of metadata for video processing has been delivered by checking that the UHD_service_type value of the EIT is XXXX (UHD1 service with a plurality of pieces of metadata, an example of 4K).

A receiver according to another embodiment of the present invention may recognize delivery of a plurality of pieces of metadata by checking presence or absence of metadata_container_descriptor when the UHD_service_type value of the EIR is 0000 (UHD1 service).

The receiver according to an embodiment of the present invention may determine whether various processing methods provided by content providers can be used in the display of the receiver using metadata_container_descriptor.

The receiver according to an embodiment of the present invention may determine whether EOTF parameter information is used for content which is currently presented or will be presented in the future and perform setting for a situation such as reservation recording in advance using metadata_container_descriptor.

ATSCEIT L16010 according to an embodiment of the present invention includes a table_id field, a section_syntax_indicator field, a section_length field, a service_id field, a version_number field, a current_next_indicator field, a section_number field, a last_section_number field, a transport_stream_id field, an original_network_id field, a segment_last_section_number field, a last_table_id field, an event_id field, a start_time field, a duration field, a running_status field, a free_CA_mode field, a descriptors_loop_length field, descriptor( ) and/or a CRC_32 field. The table_id field identifies the type of the table. The table_id field can indicate that the corresponding table section is a section constituting the EIT. The section_syntax_indicator field indicates the format of the following table section. This field indicates that the corresponding table section has a short format when set to 0 and indicates that the corresponding table section has a normal long format when set to 1. The section_length field indicates the length of the corresponding table section. The section_length field can indicate the length from the end of this field to the end of the corresponding section. The service_id field identifies each service present in a transport stream. The function of the service_id field may be the same as the program_number field of the PMT. The version number field indicates a version number of a private table section. A receiver can detect the most recent table section from among table sections stored in a memory using the version_number field and the current_next_indicator field which will be described later. The current next indicator field indicates that the currently delivered table is valid when set to 1 and indicates that the currently delivered table is not valid at present but will be valid later when set to 0. The section number field indicates the order of the corresponding section in the corresponding table. The last_section_number field indicates the order of the last section among sections constituting the corresponding table. The transport_stream_id table identifies a transport stream (TS) to be described in the corresponding table. The original_network_id field identifies the first broadcaster that has transmitted the service or event described in the corresponding table. The segment_last_section_number field indicates the last section number of a corresponding segment when a sub-table is present. When the sub-table is not segmented, this field can indicate the same value as that indicated by the last_section_number field. The last_table_id field indicates the last used table_id. The event_id field identifies each event and has a unique value in one service. The start_time field indicates the start time of a corresponding event. The duration field indicates duration of the corresponding event. For example, in the case of a program lasting 1 hour 45 minutes 30 seconds, the duration field can indicate 0x014530. The running_status field indicates the state of the corresponding event. The free_CA_mode field indicates that component streams constituting a service have not been scrambled when set to 0 and indicates that access to one or more streams is controlled by a CA system when set to 1. The CA system, that is, the conditional access system, refers to a system which provides a function of encoding broadcast content and a function of enabling only contractors to decode broadcast content to view the broadcast content in order to allow only contractors to access broadcast content. The descriptors_loop_length field indicates the sum of lengths of the following descriptors. The descriptor( ) refers to a descriptor describing each event. According to an embodiment of the present invention, this descriptor may include UHD_program_info_descriptor( ) indicating a UHD service type and/or metadata_container_descriptor. The CRC_32 field indicates a CRC value used to check whether data included in the corresponding table section contains an error.

DVB SIEIT L16020 according to an embodiment of the present invention may include the service_id field, transport_stream_id field, original_network_id field, segment_last_section_number field, last_table_id field, duration field, running_status field, free_CA_mode field, descriptors_loop_length field and/or descriptor( ) included in the ATSCEIT L16010. The service_id field indicates the ID of a service associated with the corresponding table. The transport_stream_id field indicates the ID of a transport stream through which the corresponding table is transmitted. The original_network_id field indicates the ID of a network through which the corresponding table is transmitted. The segment_last_section_number field indicates the last section number of a corresponding segment. The last_table_id field indicates the ID of the last table. The duration field indicates the duration of a corresponding event. The running_status field indicates the state of the corresponding event. The free_CA_mode field indicates whether the corresponding event has been encoded. The descriptors_loop_length field indicates the length of an event-level descriptor loop. Descriptor( ) refers to a descriptor describing each event. According to an embodiment of the present invention, this descriptor may include UHD_program_info_descriptor( ) indicating a UHD service type and/or metadata_container_descriptor.

Figures 17, 18:
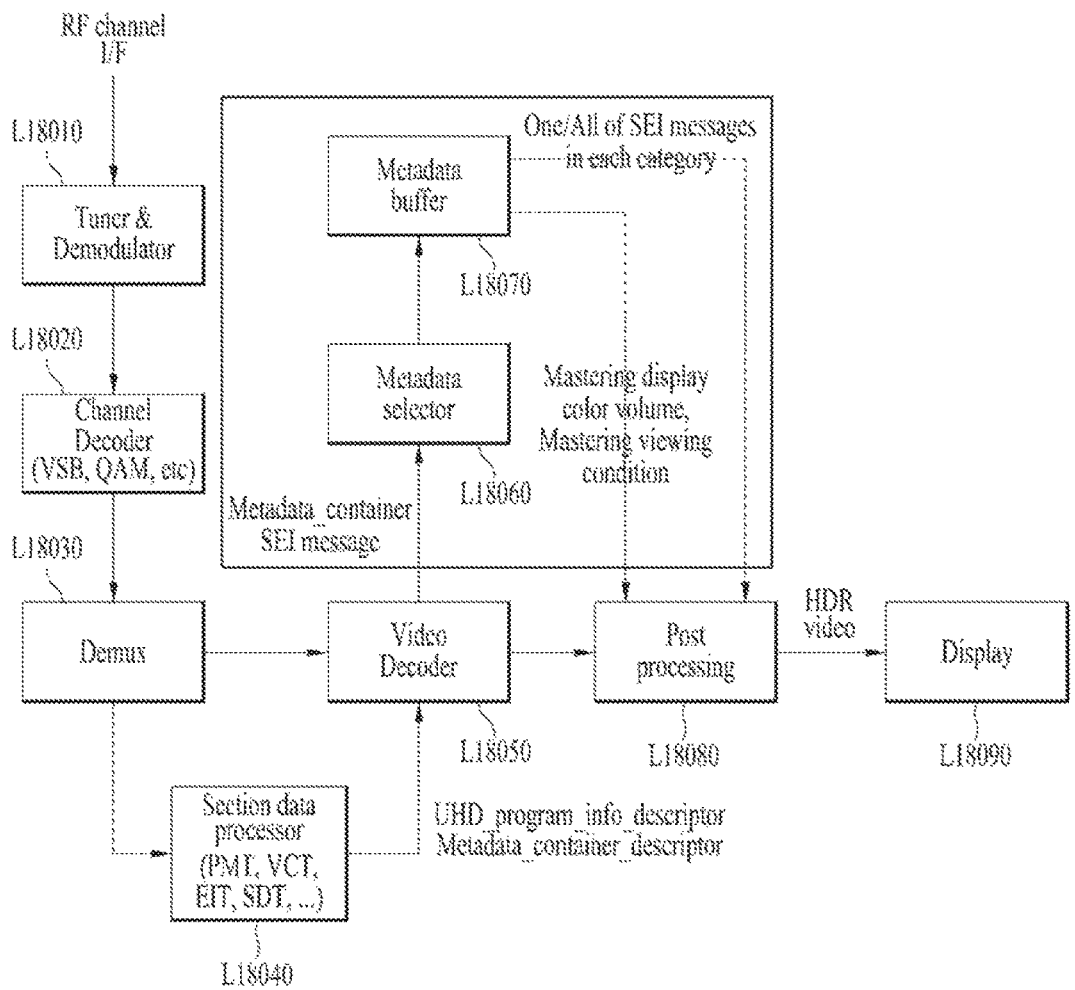
FIG. 17 is a diagram showing a configuration of metadata_container_descriptor according to an embodiment of the present invention.
FIG. 18 is a diagram showing a structure of a receiver according to an embodiment of the present invention.

FIG. 17 is a diagram showing a configuration of metadata_container_descriptor according to an embodiment of the present invention.

Metadata container information (multiple video metadata container) according to an embodiment of the present invention aims at provision of information necessary for a receiver to use a plurality of pieces of metadata selectively or in an integrated manner when a video quality enhancement service or an appropriate viewing image provision service is provided on the basis of video metadata. Here, the receiver can determine whether the display of the receiver can accept such services using information of metadata_container_descriptor.

Metadata_container_descriptor according to an embodiment of the present invention may include a descriptor_tag field, a descriptor_length field, a number_of_info field and/or metadata_container_metadata (metadata container information). The descriptor_tag field indicates that this descriptor includes metadata container information. The descriptor length field indicates the length of the descriptor. The number_of_info_field indicates the number of pieces of metadata container information provided by a producer. The metadata_container_metadata indicates metadata container information, which has been described above in detail.

FIG. 18 is a diagram showing a structure of a receiver according to an embodiment of the present invention.

When metadata container information is transmitted, the receiver according to an embodiment of the present invention may analyze this information and apply the information to HDR video.

Specifically, the receiver checks whether there is a service or media that needs to be additionally received in order to constitute the original UHDTV broadcast using UHD_program_info_descriptor of a received PMT. The receiver according to an embodiment of the present invention can recognize that there is additional information (metadata container information) delivered through an SEI message when UHD_service_type in UHD_program_info_descriptor of the PMT is XXXX. A receiver according to another embodiment of the present invention can recognize that there is video-related additional information (metadata container information) delivered using an SEI message through an EIT when UHD_service_type in UHD_program_info_descriptor is 0000 (8K is 0001). When the PMT and/or the EIT directly include metadata container information as well as UHD_program_info_descriptor, the receiver can directly recognize presence of the metadata container information by receiving the PMT and/or the EIT.

The receiver according to an embodiment of the present invention recognizes metadata information which can be used in video through a metadata container SEI message, the metadata container descriptor of the PMT and/or the metadata container descriptor of the EIT. When multiple pieces of metadata are present, the receiver may select metadata or a metadata set which can be selectively used from multiple pieces of metadata described by metadata container information and access an SEI message carrying the selected metadata or metadata set using PayloadType and/or a set number to acquire specific information for video quality processing described by the metadata or metadata set. The receiver can enhance video quality through an internal/external algorithm after acquisition of the specific information (static metadata and dynamic metadata in the case of HDR video) for video quality processing.

This figure shows an embodiment of receiver operation when a plurality of pieces of metadata is delivered. According to this embodiment, metadata types are classified according to usage of metadata. Upon determining whether to selectively use a plurality of pieces of received metadata or use all of the plurality of pieces of metadata, the receiver stores necessary metadata in a buffer and then delivers the metadata to a processing unit.

The receiver according to an embodiment of the present invention may include a tuner L18010, a demodulator L18010, a channel decoder L18020, a demultiplexer L18030, a signaling information processor (section information processor) L18040, a video decoder L18050, a metadata selector L18060, a metadata buffer L18070, a post-processor L18080 and/or a display L18090. The tuner may receive a broadcast signal including metadata container information and UHD content. The demodulator may demodulate the received broadcast signal. The channel decoder may channel-decode the demodulated broadcast signal. The demultiplexer may extract signaling information including metadata container information, video data, audio data, etc. from the broadcast signal. The signaling information processor may process section data such as a PMT, a VCT, an EIT and an SDT in the received signaling information. The video decoder may decode a received video stream. Here, the video decoder can decode the video stream using information included in metadata_container_descriptor and/or UHD_program_info_descriptor included in the PMT, EIT and the like extracted by the signaling information processor. The metadata selector may select metadata necessary for the receiver using information included in a metadata container SEI message extracted from the video stream. This has been described above in detail. The metadata buffer delivers metadata selected from a plurality of pieces of metadata to the post-processor. Here, the selected metadata may include mastering display related information and/or mastering viewing condition information. The post-processor may process video quality enhancement of content using the metadata delivered from the metadata buffer. The display may display the video processed by the post-processor. Each component in the receiver has been described above in detail.

Figure 19:
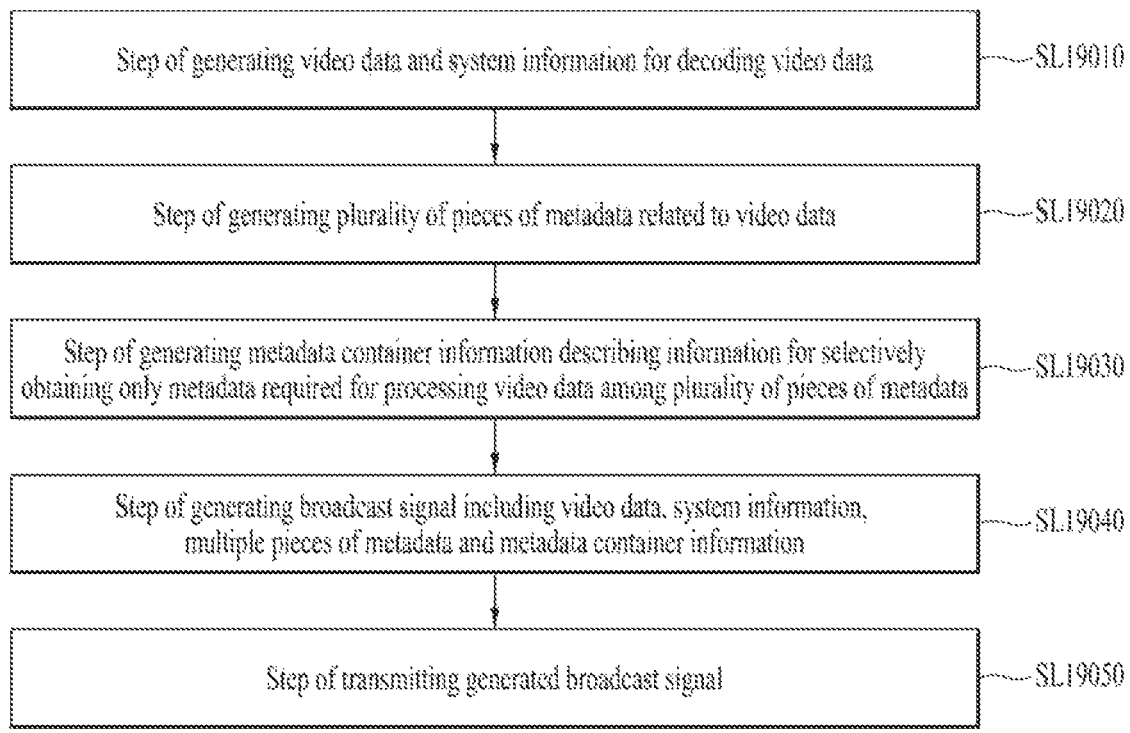
FIG. 19 is a diagram showing a broadcast signal transmission method according to an embodiment of the present invention.

FIG. 19 is a diagram showing a method of transmitting a broadcast signal according to an embodiment of the present invention.

The method of transmitting a broadcast signal according to an embodiment of the present invention includes a step SL19010 of generating video data and system information for decoding the video data, a step S19020 of generating a plurality of pieces of metadata related to the video data, a step S19030 of generating metadata container information describing information for selectively acquiring only metadata necessary to process the video data from among the plurality of pieces of metadata, a step SL19040 of generating a broadcast signal including the video data, the system information, the plurality of pieces of metadata and the metadata container information and/or a step SL19050 of transmitting the generated broadcast signal.

According to another embodiment of the present invention, the metadata container information includes type information for identifying the type of the plurality of pieces of metadata, information indicating the number of pieces of metadata having the type indicated by the type information, and information indicating whether all of multiple pieces of metadata need to be applied or only one piece of metadata from among the multiple pieces of metadata needs to be applied when the multiple pieces of metadata have the type indicated by the type information. Here, the aforementioned information refers to the above-described metadata_type, number_of_metadata and exclusive_metadata_flag.

According to another embodiment of the present invention, the metadata container information includes information on a position at which metadata having the type indicated by the type information is transmitted. Here, the aforementioned information refers to metadata_PayloadType.

According to another embodiment of the present invention, the position information indicates payload type information of an SEI (supplemental enhancement information) message carrying metadata having the type indicated by the type information, and when multiple pieces of metadata have the type indicated by the type information and are transmitted through one SEI message, the metadata container information includes set number information for identifying the multiple pieces of metadata in the one SEI message. Here, the aforementioned information refers to the above-described metadata_PayloadType and metadata_set_number.

According to another embodiment of the present invention, the metadata container information includes information indicating whether metadata having the type indicated by the type information changes in predetermined units in the video data and information indicating whether the metadata having the type indicated by the type information needs to be updated. Here, the aforementioned information refers to the above-described metadata_change_flag and metadata_version_number.

According to another embodiment of the present invention, the metadata container information includes information indicating presence or absence of sub-types by which the multiple pieces of metadata having the type indicated by the type information are sub-divided, sub-type information for dividing the multiple pieces of metadata, and information on a position at which metadata having a sub-type indicated by the sub-type information is transmitted. Here, the aforementioned information refers to the above-described metadata_sub_type_flag, metadata_sub_type and metadata_PayloadType.

According to another embodiment of the present invention, the metadata container information includes information indicating whether all of the multiple pieces of metadata have changed according to reset of a program. Here, the aforementioned information refers to the above-described program_reset_flag.

Figure 20:
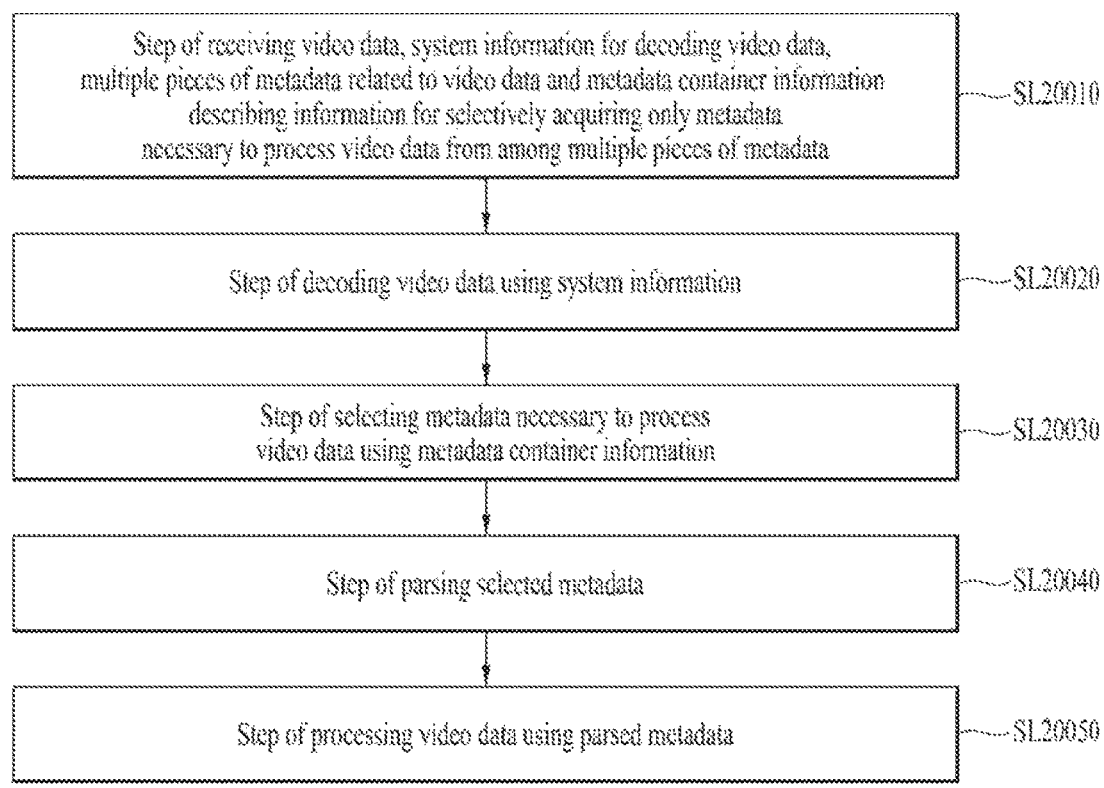
FIG. 20 is a diagram showing a broadcast signal reception method according to an embodiment of the present invention.

FIG. 20 is a diagram showing a method of receiving a broadcast signal according to an embodiment of the present invention.

The method of receiving a broadcast signal according to an embodiment of the present invention includes a step SL20010 of receiving video data, system information for decoding the video data, a plurality of pieces of metadata related to the video data and metadata container information describing information for selectively acquiring only metadata necessary to process the video data from among the plurality of pieces of metadata, a step SL20020 of decoding the video data using the system information, a step SL20030 of selecting metadata necessary to process the video data using the metadata container information, a step SL20040 of parsing the selected metadata and/or a step SL20050 of processing the video data using the parsed metadata. This has been described above in detail.

Figure 21:
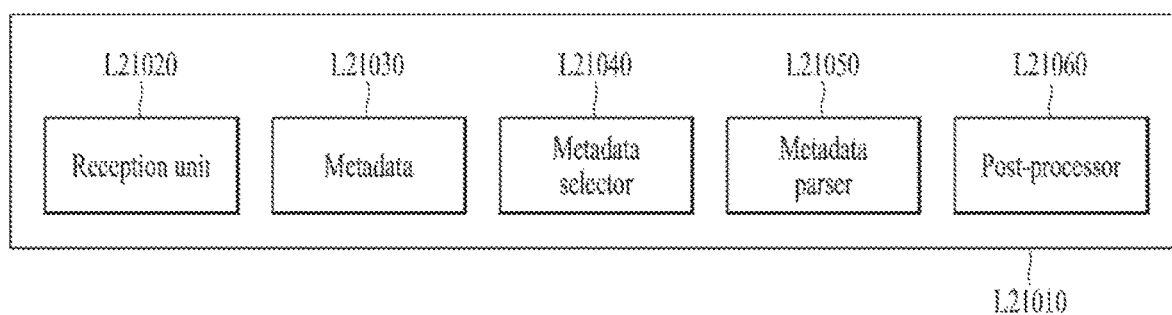
FIG. 21 is a diagram showing a configuration of a broadcast signal reception device according to an embodiment of the present invention.

FIG. 21 is a diagram showing a configuration of a broadcast signal reception device according to an embodiment of the present invention.

The broadcast signal reception device L21010 according to an embodiment of the present invention includes a reception unit L21020 for receiving video data, system information for decoding the video data, a plurality of pieces of metadata related to the video data and metadata container information describing information for selectively acquiring only metadata necessary to process the video data from among the plurality of pieces of metadata, a decoder L21030 for decoding the video data using the system information, a metadata selector L21040 for selecting metadata necessary to process the video data using the metadata container information, a metadata parser L21050 for parsing the selected metadata and/or a post-processor L21060 for processing the video data using the parsed metadata. Each component of the reception device has been described above in detail.

Modules or units may be processors executing consecutive processes stored in a memory (or a storage unit). The steps described in the aforementioned embodiments can be performed by hardware/processors. Modules/blocks/units described in the above embodiments can operate as hardware/processors. The methods proposed by the present invention can be executed as code. Such code can be written on a processor-readable storage medium and thus can be read by a processor provided by an apparatus.

While the embodiments have been described with reference to respective drawings for convenience, embodiments may be combined to implement a new embodiment. In addition, designing computer-readable recording media storing programs for implementing the aforementioned embodiments is within the scope of the present invention.

The apparatus and method according to the present invention are not limited to the configurations and methods of the above-described embodiments and all or some of the embodiments may be selectively combined to obtain various modifications.

The methods proposed by the present invention may be implemented as processor-readable code stored in a processor-readable recording medium included in a network device. The processor-readable recording medium includes all kinds of recording media storing data readable by a processor. Examples of the processor-readable recording medium include a ROM, a RAM, a CD-ROM, a magnetic tape, a floppy disk, an optical data storage device and the like, and implementation as carrier waves such as transmission over the Internet. In addition, the processor-readable recording medium may be distributed to computer systems connected through a network, stored and executed as code readable in a distributed manner.

Although the preferred embodiments of the present invention have been disclosed for illustrative purposes, those skilled in the art will appreciate that various modifications, additions and substitutions are possible, without departing from the scope and spirit of the invention as disclosed in the accompanying claims. Such modifications should not be individually understood from the technical spirit or prospect of the present invention.

Both apparatus and method inventions are mentioned in this specification and descriptions of both the apparatus and method inventions may be complementarily applied to each other.

Those skilled in the art will appreciate that the present invention may be carried out in other specific ways than those set forth herein without departing from the spirit and essential characteristics of the present invention. Therefore, the scope of the invention should be determined by the appended claims and their legal equivalents, not by the above description, and all changes coming within the meaning and equivalency range of the appended claims are intended to be embraced therein.

In the specification, both the apparatus invention and the method invention are mentioned and description of both the apparatus invention and the method invention can be applied complementarily.

MODE FOR INVENTION

Various embodiments have been described in the best mode for carrying out the invention.

INDUSTRIAL APPLICABILITY

The present invention is applicable to the broadcast industry.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

The invention claimed is:

1. A method of processing a picture for a video content generated based on a high efficiency video coding in a transmitter, the method comprising:
   generating multiple supplement enhancement information (SEI) messages including a first SEI message and a second SEI message, signaling information in the first SEI message being applied to the video content while signaling information in the second SEI message being applied to a specific region only within the picture,
   wherein the second SEI message comprises a first group of sub SEI messages and position information for identifying each of regions specified in the first group of sub SEI messages,
   wherein the first group of sub SEI messages are used to apply to the each of regions within the picture, and
   wherein a second group of sub SEI messages not included in the second SEI message are used to apply to all regions within the picture;
   encoding the picture for the video content; and
   transmitting the encoded picture with the multiple SEI messages over at least one network.

2. The method according to claim 1, wherein the multiple SEI messages include type information for indicating a type of a plurality of pieces of metadata, information indicating the number of pieces of metadata having a type indicated by the type information, and information indicating whether all of multiple pieces of metadata need to be applied or only one piece of metadata from among the multiple pieces of metadata needs to be applied when the multiple pieces of metadata have a type indicated by the type information, and
   the multiple SEI messages further include information on a position at which metadata having the type indicated by the type information is transmitted.

3. The method according to claim 2, wherein the multiple SEI messages include information indicating whether metadata having a type indicated by the type information is metadata changing in predetermined units in the video content and information indicating whether the metadata having the type indicated by the type information needs to be updated.

4. The method according to claim 2, wherein the multiple SEI messages include information indicating presence or absence of sub-types by which the multiple pieces of metadata having the type indicated by the type information are sub-divided, sub-type information for dividing the multiple pieces of metadata, and information on a position at which metadata having a sub-type indicated by the sub-type information is transmitted.

5. The method according to claim 1, wherein the multiple SEI messages include information indicating whether all of multiple pieces of metadata have changed according to reset of a program.

6. A method of processing a picture for a video content generated based on a high efficiency video coding in a receiver, the method comprising:
receiving the picture with multiple supplement enhancement information (SEI) messages including a first SEI message and a second SEI message over at least one network, signaling information in the first SEI message being applied to the video content while signaling information in the second SEI message being applied to a specific region only within the picture,
wherein the second SEI message comprises a first group of sub SEI messages and position information for identifying each of regions specified in the first group of sub SEI messages,
wherein the first group of sub SEI messages are used to apply to the each of regions within the picture, and
wherein a second group of sub SEI messages not included in the second SEI message are used to apply all regions within the picture;
parsing at least one of the first group of sub SEI messages or the second group of sub SEI messages; and
decoding the picture for the video content based on the at least one of the first group of sub SEI messages or the second group of sub SEI messages.

7. The method according to claim 6, wherein the multiple SEI messages include information indicating whether metadata having a type indicated by type information is metadata changing in predetermined units in the video content and information indicating whether the metadata having the type indicated by the type information needs to be updated.

8. The method according to claim 6, wherein the multiple SEI messages include information indicating presence or absence of sub-types by which multiple pieces of metadata having a type indicated by type information are sub-divided, sub-type information for dividing the multiple pieces of metadata, and information on a position at which metadata having a sub-type indicated by the sub-type information is transmitted.

9. The method according to claim 6, wherein the multiple SEI messages include information indicating whether all of multiple pieces of metadata have changed according to reset of a program.

10. A reception device for processing a picture for a video content generated based on a high efficiency video coding, the reception device comprising:
a receiver to receive the picture with multiple supplemental enhancement information (SEI) messages including a first SEI message and a second SEI message over at least one network, signaling information in the first SEI message being applied to the video content while signaling information in the second SEI message being applied to a specific region only within the picture,
wherein the second SEI message comprises a first group of sub SEI messages and position information for identifying each of regions specified in the first group of sub SEI messages,
wherein the first group of sub SEI messages are used to apply to the each of regions within the picture, and
wherein a second group of sub SEI messages not included in the second SEI message are used to apply to all regions within the picture;
a parser to parse at least one of the first group of sub SEI messages or the second group of sub SEI messages; and
a decoder to decode the picture for the video content based on the at least one of the first group of sub SEI messages or the second group of sub SEI messages.

* * * * *